United States Patent
Pang et al.

(10) Patent No.: US 11,724,406 B2
(45) Date of Patent: Aug. 15, 2023

(54) PNEUMATIC CONTROLLED SOFT GRIPPER, MANUFACTURING METHOD THEREOF AND ARTICLE TRANSPORT METHOD USING SOFT GRIPPER

(71) Applicant: Research & Business Foundation Sungkyunkwan University, Suwon-si (KR)

(72) Inventors: Chang Hyun Pang, Suwon-si (KR); Heon Joon Lee, Seoul (KR); Sang Yul Baik, Suwon-si (KR); Gui Won Hwang, Ansan-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 412 days.

(21) Appl. No.: 16/913,326

(22) Filed: Jun. 26, 2020

(65) Prior Publication Data
US 2021/0122065 A1    Apr. 29, 2021

(30) Foreign Application Priority Data

Oct. 23, 2019  (KR) .................... 10-2019-0132095
Jun. 19, 2020  (KR) .................... 10-2020-0075021

(51) Int. Cl.
*B25J 15/06*    (2006.01)

(52) U.S. Cl.
CPC ................ *B25J 15/0683* (2013.01)

(58) Field of Classification Search
CPC .. B25J 15/0683; B25J 15/065; B25J 15/0658; B66C 1/0231; B66C 1/0293; B25B 11/007

USPC ................. 294/186, 187, 189
See application file for complete search history.

(56) References Cited

U.S. PATENT DOCUMENTS

| | | | | |
|---|---|---|---|---|
| 2,871,053 A * | 1/1959 | Richter | G01B 5/0004 | 248/205.8 |
| 2,929,653 A * | 3/1960 | Hund | B65B 21/12 | 294/90 |
| 3,291,518 A * | 12/1966 | Weinert | B66F 9/181 | 294/186 |
| 3,330,589 A * | 7/1967 | Mumma | B66C 1/0275 | 294/189 |
| 3,602,543 A * | 8/1971 | Sjodin | B66C 1/025 | 248/363 |
| 3,694,020 A * | 9/1972 | Becker | B66C 1/0212 | 294/183 |
| 4,221,356 A * | 9/1980 | Fortune | B25B 11/005 | 269/21 |

(Continued)

*Primary Examiner* — Dean J Kramer
(74) *Attorney, Agent, or Firm* — NSIP Law

(57) ABSTRACT

A pneumatic controlled soft gripper includes a chamber having a negative-pressure action space defined therein and having an opening communicating with the negative-pressure action space; a sucker extending radially outwardly from the opening of the chamber and having an annular contact surface; an expandable and contractible protuberance protruding from a top face of the negative-pressure action space opposite to the opening, wherein the protuberance is received in the negative-pressure action space, and has a gas pocket defined therein; and a gas channel extending from an outer face of the chamber into the gas pocket, wherein gas flows into and out of the gas pocket through the gas channel.

12 Claims, 19 Drawing Sheets

(56) References Cited

U.S. PATENT DOCUMENTS

| | | | | |
|---|---|---|---|---|
| 4,669,915 A * | 6/1987 | Shatto, Jr. | ............ | B25J 15/0616 |
| | | | | 248/205.8 |
| 4,674,915 A * | 6/1987 | Shatto, Jr. | ................. | B25J 5/00 |
| | | | | 248/205.8 |
| 7,086,675 B2 * | 8/2006 | Jacobs | ................... | B65G 47/92 |
| | | | | 294/183 |
| 7,690,705 B1 * | 4/2010 | Roberts | ............... | G11B 25/043 |
| | | | | 294/902 |
| 2004/0207219 A1 * | 10/2004 | Schmierer | ............. | B65G 47/91 |
| | | | | 294/189 |

* cited by examiner

[FIG. 1]
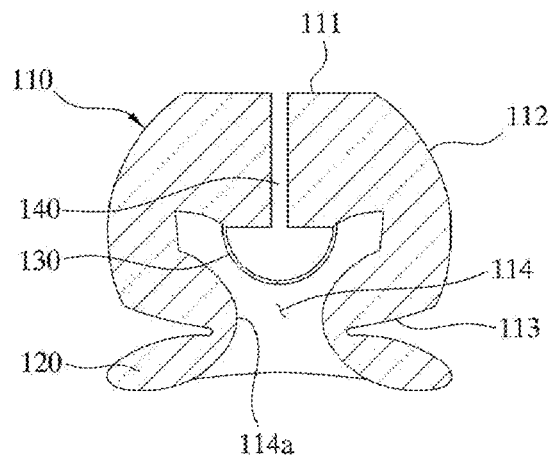
[FIG. 2]
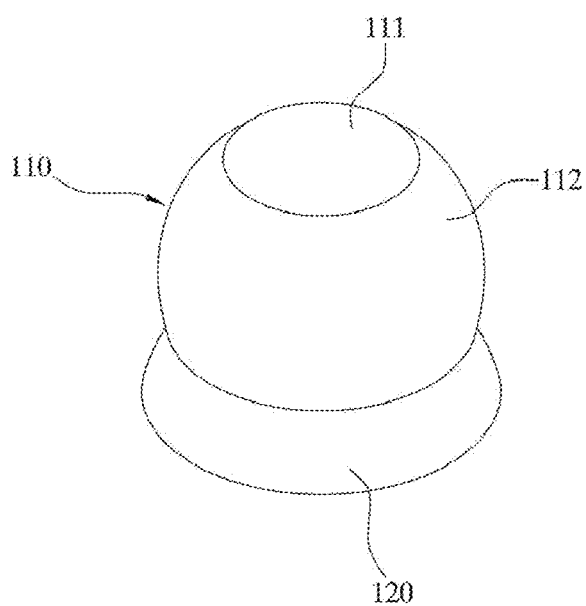

[FIG. 4]

[FIG. 7]
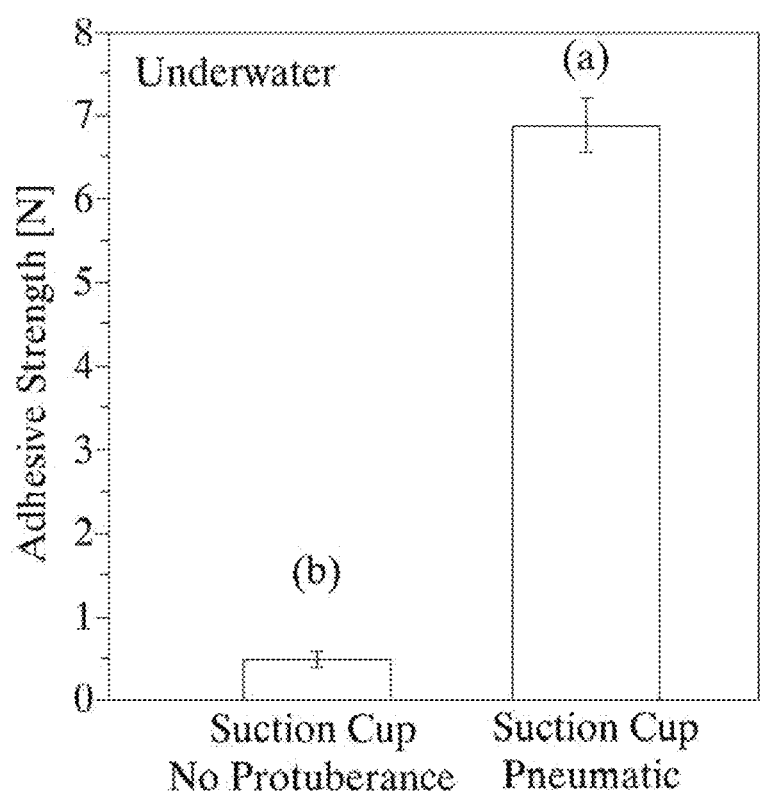

[FIG. 8]
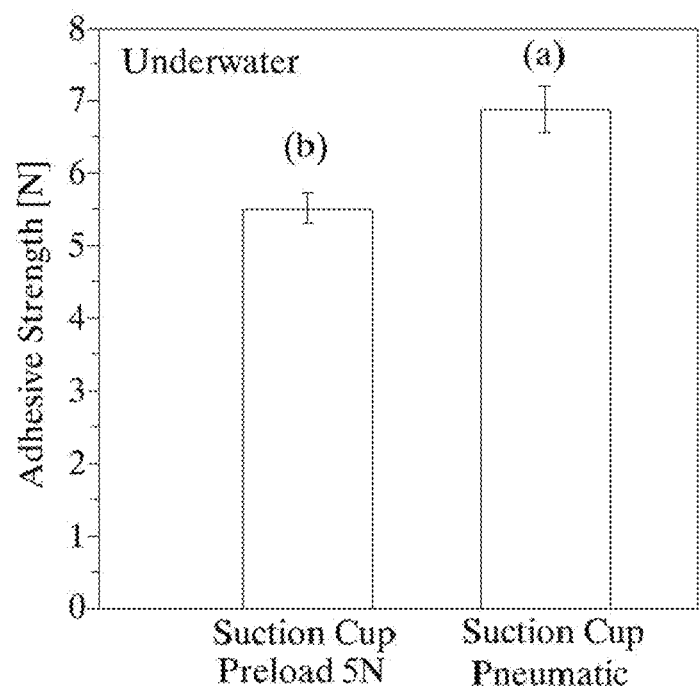

[FIG. 9A]
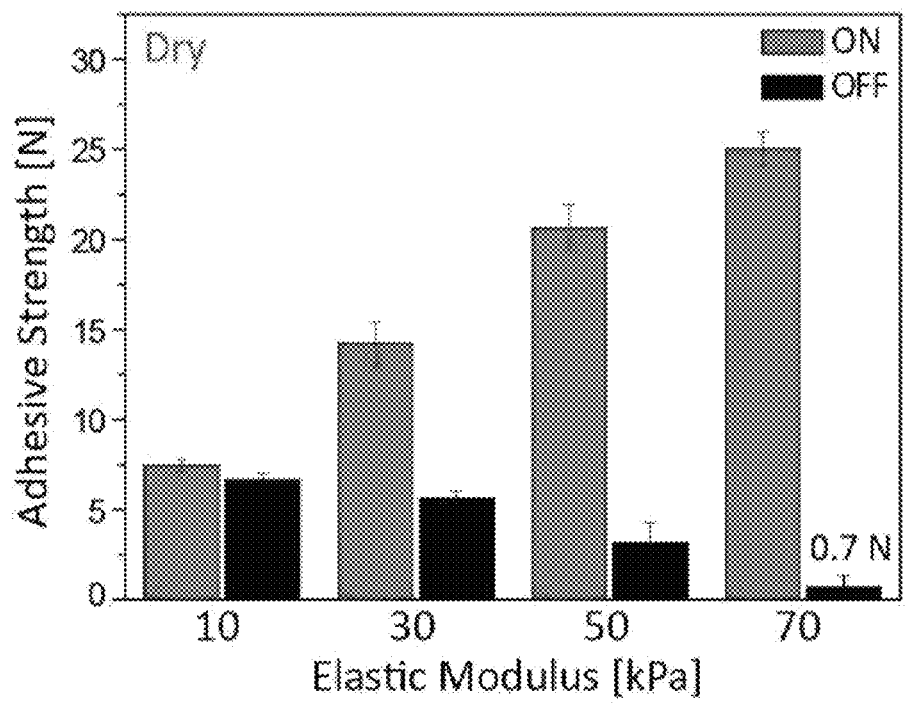
[FIG. 9B]
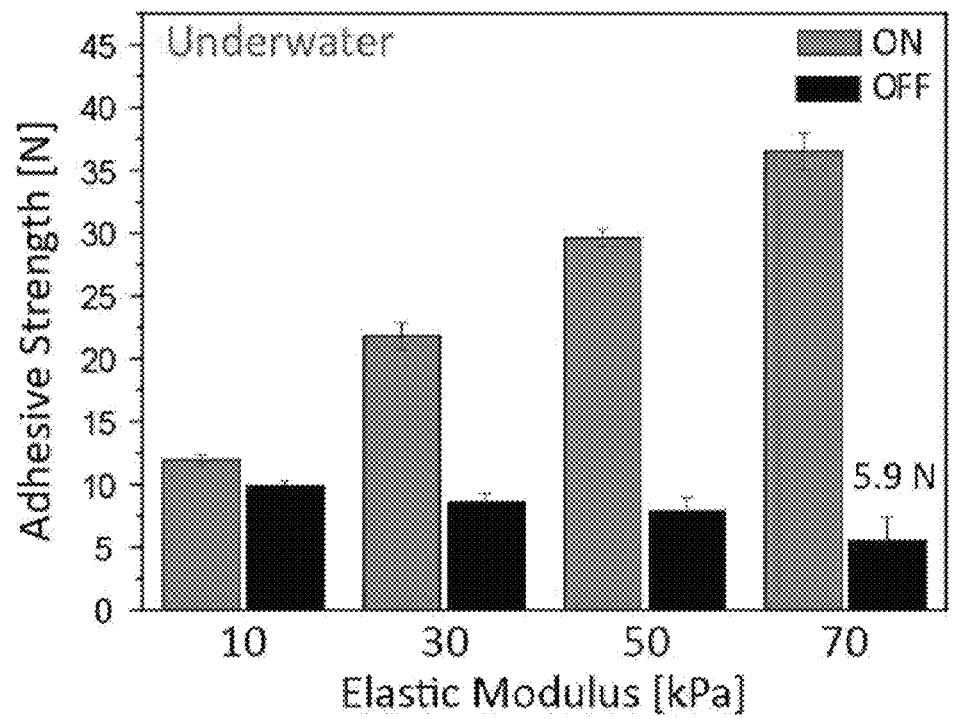

[FIG. 10A]
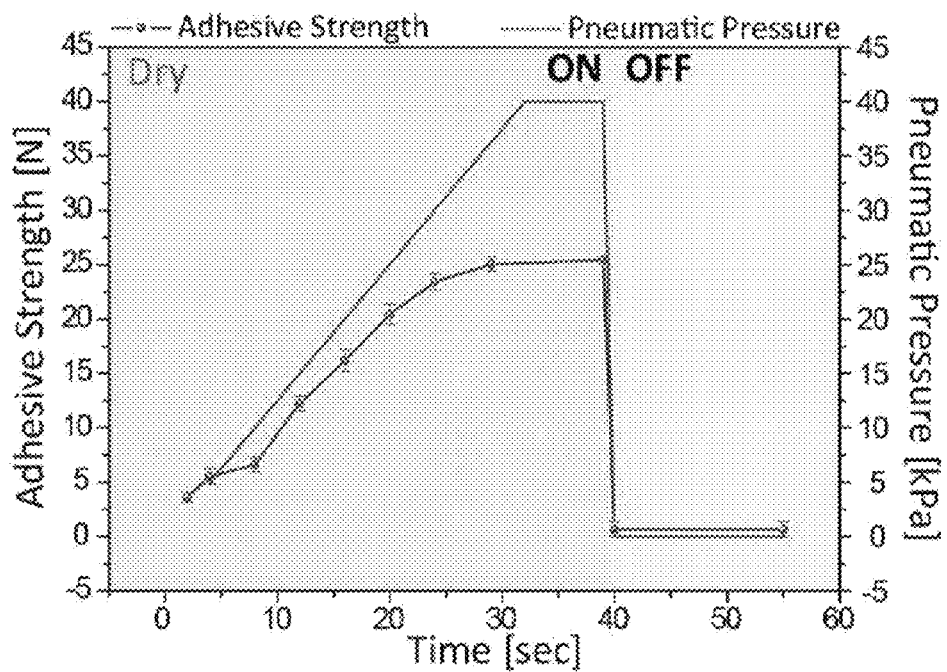
[FIG. 10B]
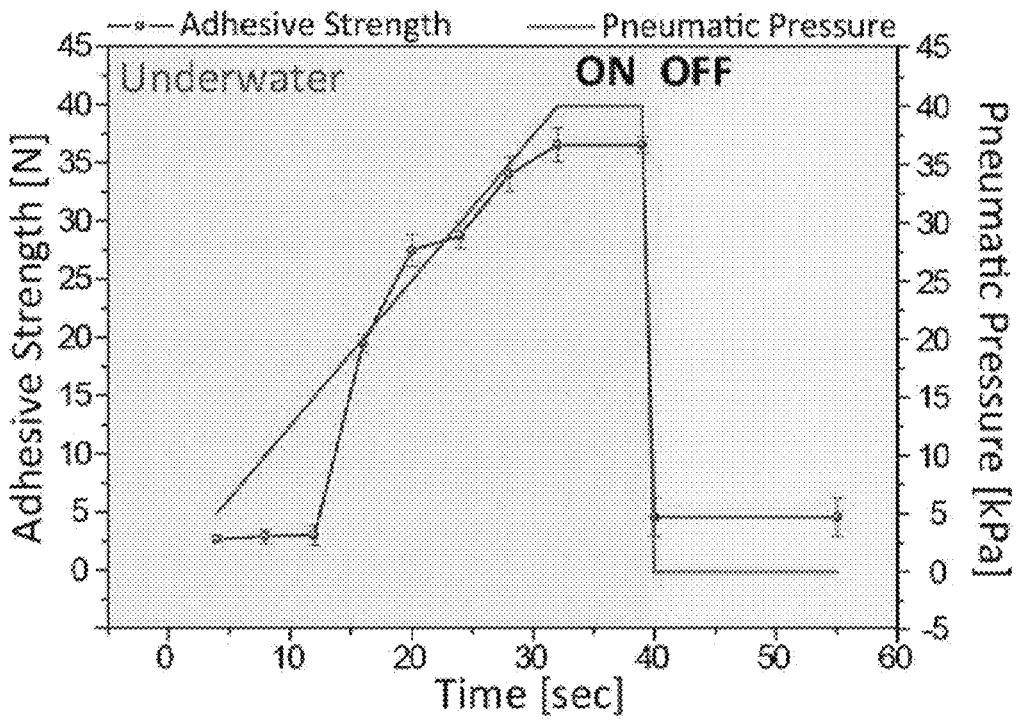

[FIG. 11B]
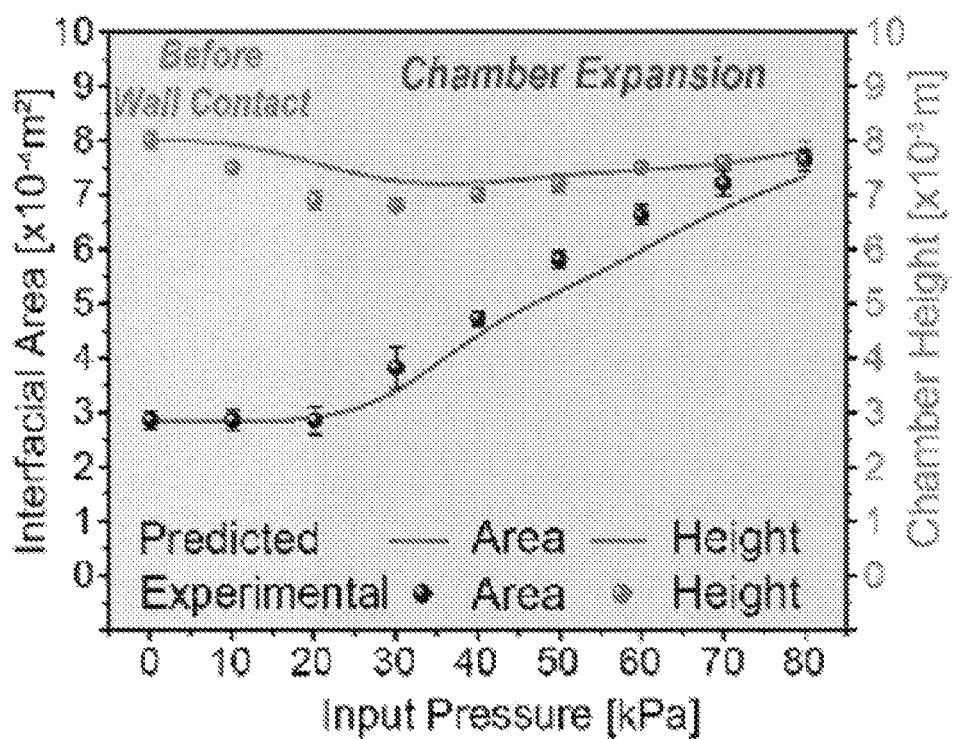

[FIG. 11D]
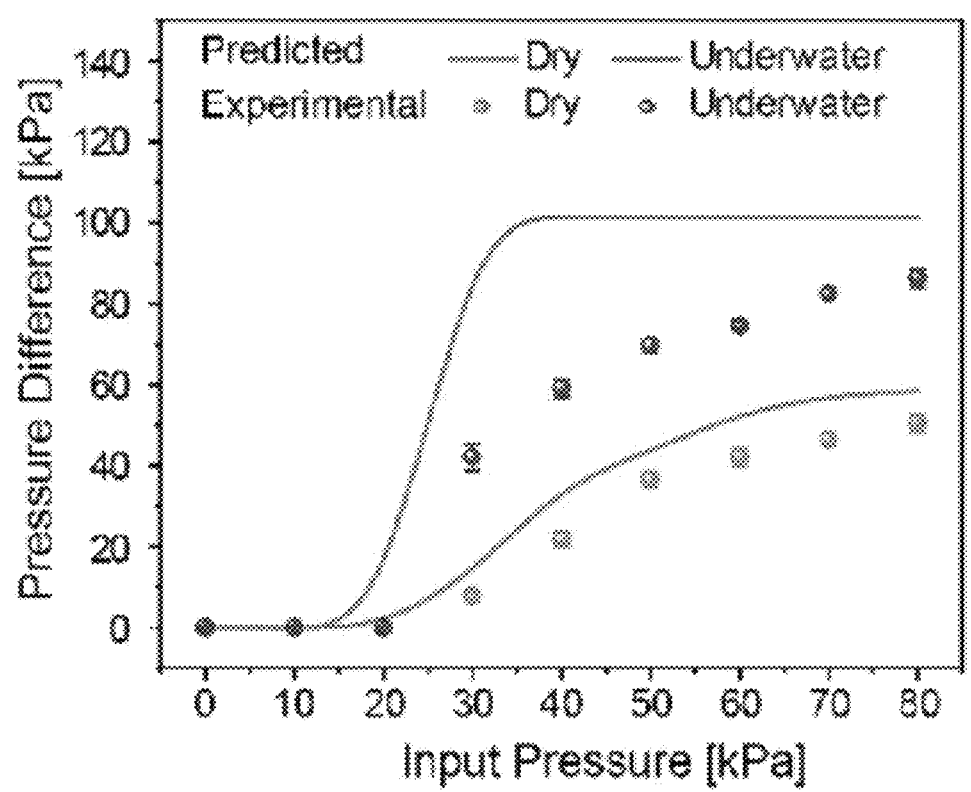
[FIG. 12A]
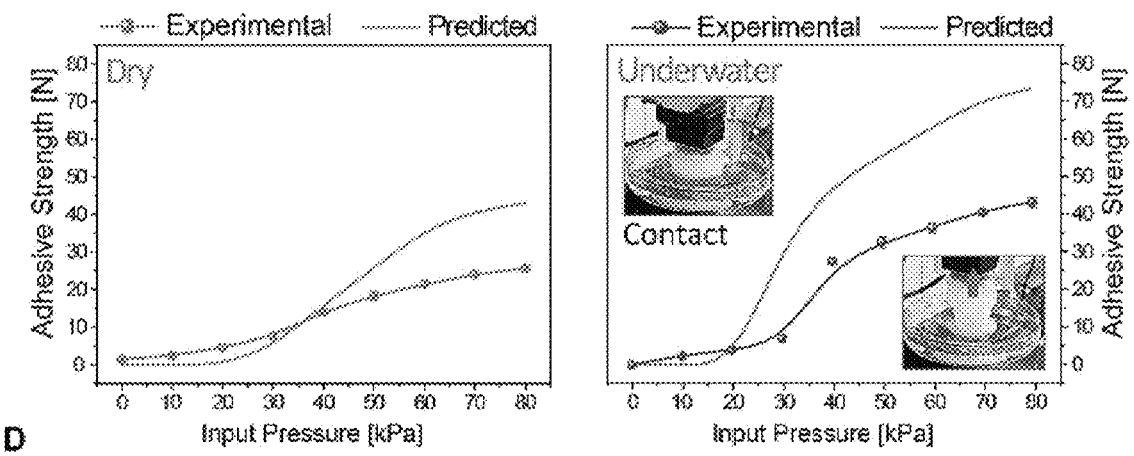
D

[FIG. 12C]
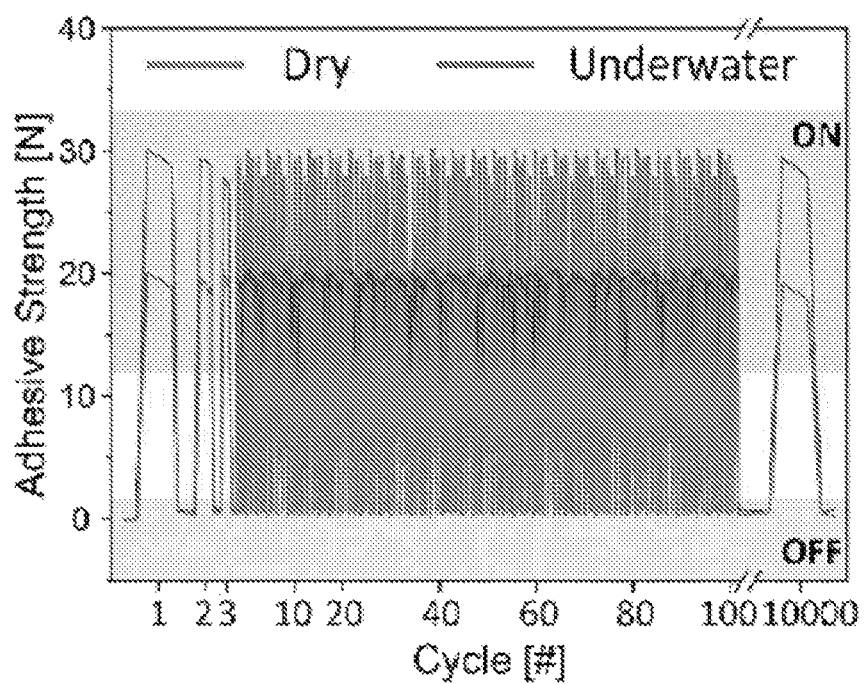

【FIG. 13A】
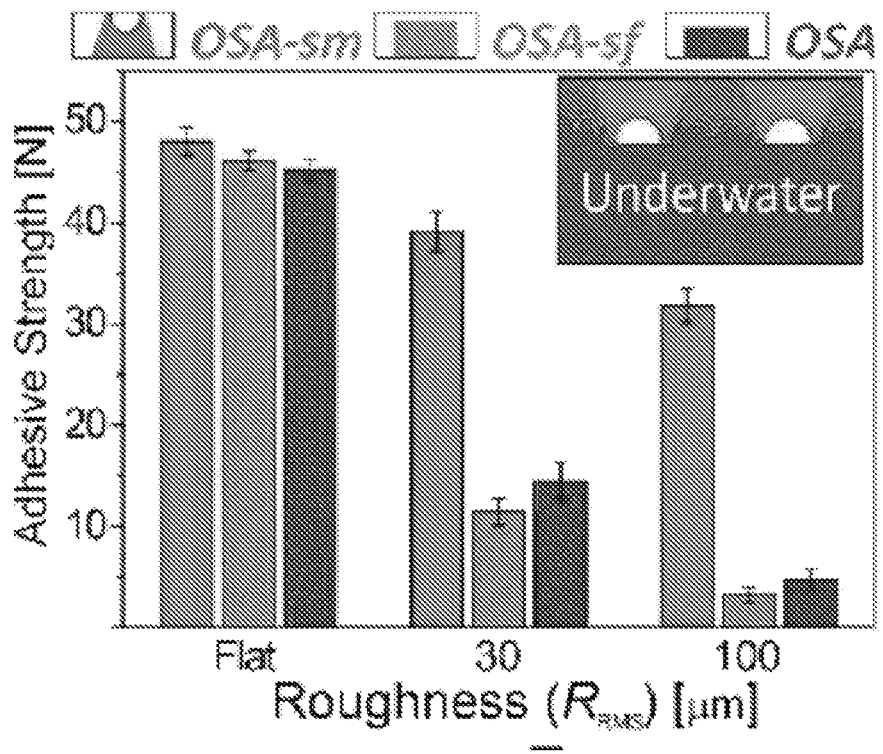

[FIG. 14]
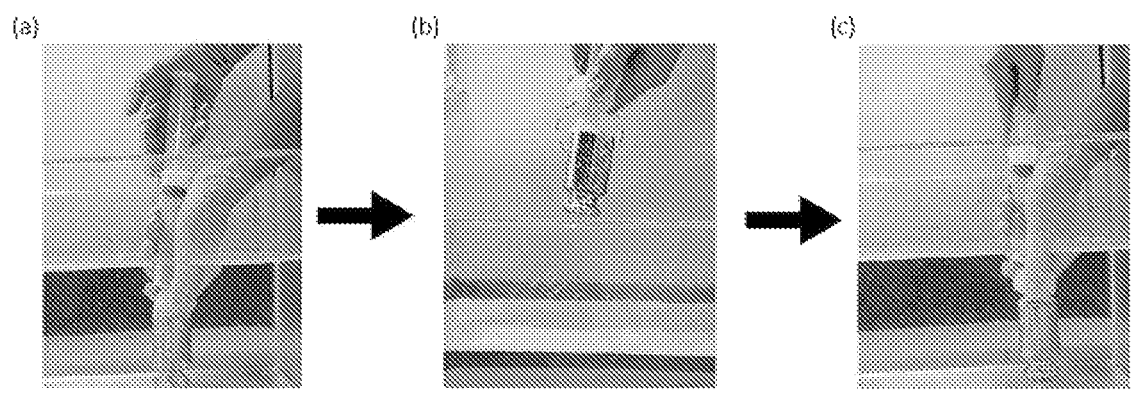

PNEUMATIC CONTROLLED SOFT GRIPPER, MANUFACTURING METHOD THEREOF AND ARTICLE TRANSPORT METHOD USING SOFT GRIPPER

CROSS-REFERENCE TO RELATED APPLICATION

This application claims a benefit under 35 U.S.C. § 119(a) of Korean Patent Application No. 10-2019-0132095 filed on Oct. 23, 2019 and Korean Patent Application No. 10-2020-0075021 filed on Jun. 19, 2020, on the Korean Intellectual Property Office, the entire disclosure of which is incorporated herein by reference for all purposes.

BACKGROUND

1. Field

The present disclosure relates to a pneumatic controlled soft gripper, a manufacturing method thereof, and an object transfer method using the soft gripper. More specifically, the present disclosure relates to a pneumatic controlled soft gripper capable of adhering to various surfaces, a manufacturing method thereof, and an object transfer method using the soft gripper.

2. Description of Related Art

An suction system for transferring an object are widely used in various fields such as a semiconductor process, a home appliance production process, and a medical article production process.

The suction system employs a technique of generating an adhesive force by inducing a negative-pressure at an interface between a suction port made of an elastic material and an object.

However, in most of conventional suction systems, in order to induce the negative-pressure between the suction port and the object, a vertical pressure is applied from a position above the suction port toward a surface of the object such that adhesion between the suction port and the surface is achieved. Alternatively, the negative-pressure is generated by sucking fluid from an inside of the suction port such that adhesion between the suction port and the surface is achieved.

In the conventional suction system, in the scheme for generating the negative-pressure by applying the vertical pressure toward the surface, the negative-pressure between the suction port and the surface is not sufficiently implemented, so that the adhesion is easily removed during transfer of the object and thus the transfer of the object is not achieved. Especially, in a humid environment or an underwater environment, when the negative-pressure is generated, liquid flows into the suction port to interfere with the generation of the negative-pressure. Thus, in the wet or aquatic environments, the negative-pressure based sucker chamber has significantly reduced adhesion.

To solve this problem, Korean Patent No. 10-1745803 assigned to a present applicant discloses an approach in which a protuberance is formed on a sucker that mimics an octopus sucker, thereby improving adhesion by the sucker, especially in the humid environment. This approach achieved very good adhesion. However, a vertical pressure from top to bottom is needed to induce adhesion to an inner wall of a chamber of the sucker and to induce decompression in the chamber of the sucker. In order to ensure contact between the inner wall of the chamber and the protuberance, a shape and a size of the sucker and a size of the protuberance are limited, thereby to limit the adhesion by the chamber of the sucker.

Further, in the above approach, detachment of an object from the chamber of the sucker is not easy. A pressure in the chamber of the sucker must be increased by twisting the sucker or lifting a contact surface of the sucker for the detachment of the object from the chamber of the sucker. Alternatively, the sucker should be strongly pulled away from the object to apply a force than a maximum adhesion value at which the sucker adheres to the object due to a pressure difference to detach the object therefrom. However, this strong pulling may damage the contact surface or a complicated configuration is required for the detachment.

In other words, the conventional suction system has limited type of adhesion targets thereto. Further, it is difficult to implement sufficient negative-pressure for stable adhesion, so that stable transfer of the object becomes difficult. Further, the conventional suction system may not be used in various environments such as a dry environment and the underwater environment and may not be used for an article sensitive to a pressure.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a novel pneumatic controlled negative-pressure suction method that may easily implement adhesion in water and implement easy suction via easy negative-pressure generation and easy desorption via easy negative-pressure removal.

Another purpose of the present disclosure is to provide a soft gripper which may implement and maintain sufficient adhesion to various surfaces and easily control repeated attachment and detachment of an object thereto or therefrom, a manufacturing method thereof, and an object transfer method using the soft gripper.

Still another purpose of the present disclosure is to provide a soft gripper that may implement and maintain sufficient adhesion in various environments, a manufacturing method thereof, and an object transfer method using the soft gripper.

Yet still another purpose of the present disclosure to provide a soft gripper which may be applied to various surfaces and pressure-sensitive materials, a manufacturing method thereof, and an object transfer method using the soft gripper.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides a pneumatic controlled soft gripper comprising: a chamber having a negative-pressure action space defined therein and having an opening communicating with the negative-pressure action space; a sucker extending radially outwardly from the opening of the chamber and having an annular contact surface; an expandable and contractible protuberance protruding from a top face of the negative-pressure action space opposite to the opening, wherein the protuberance is received in the negative-pressure action space, and has a gas pocket defined therein; and a gas channel extending from an outer face of the chamber into the gas pocket, wherein gas flows into and out of the gas pocket through the gas channel.

In one implementation of the first aspect, the chamber has an inner wall disposed between the sucker and the protuberance and having a curved shape convex into the negative-pressure action space.

In one implementation of the first aspect, the chamber has a partially spherical shape.

In one implementation of the first aspect, the protuberance has a hemisphere shape.

In one implementation of the first aspect, the gripper further comprises projections on a surface of the sucker.

In one implementation of the first aspect, the gripper is able to work in an underwater environment.

In one implementation of the first aspect, the pneumatic controlled soft gripper is made of a material selected from a group consisting of polydimethylsiloxane, polyurethane acrylate, polystyrene, polyvinyl alcohol, polyurethane, polyethylene glycol, and combinations thereof.

A second aspect of the present disclosure provides a method for manufacturing the pneumatic gripper as defined above, the method comprising: preparing a first mold having: a first polymer receiving groove in a three-dimensional shape corresponding to a combination of outer shapes of the chamber and the sucker; and a second polymer receiving groove located in a central upper portion of the first polymer receiving groove; preparing a second mold having: a cover; a gas channel forming portion having a pillar shape extending from a center of the cover; and a protuberance forming portion coupled to a distal end of the pillar shape and having a shape corresponding to an outer shape of the second polymer receiving groove; injecting a polymer material into the first polymer receiving groove and the second polymer receiving groove; disposing the second mold on top of the first mold such that the protuberance forming portion is received in the second polymer receiving groove; curing the first mold in a high temperature environment for a predefined period of time; separating the second mold from first mold; and withdrawing a soft gripper formed in the first mold out of the first mold.

In one implementation of the second aspect, the method further comprises, after preparing the second mold, surface-treating the first mold and the second mold.

In one implementation of the second aspect, the surface treatment of the first mold and the second mold includes: immersing the first mold and the second mold in a self-assembled monolayer (SAM) solution for 50 to 70 minutes; withdrawing the first mold and the second mold out of the solution; and curing the first mold and the second mold in an oven of 50 to 70° C. for 11 to 13 hours.

In one implementation of the second aspect, the polymer material includes a material selected from a group consisting of polydimethylsiloxane, polyurethane acrylate, polystyrene, polyvinyl alcohol, polyurethane, polyethylene glycol, and combinations thereof.

A third aspect of the present disclosure provides a method for transferring an object using the pneumatic gripper as defined above, the method comprising: providing the pneumatic gripper; bringing the sucker into close contact with a surface of the object; creating a negative-pressure in the negative-pressure action space; transferring the object to a target position; and removing the negative-pressure in the negative-pressure action space.

In one implementation of the third aspect, creating the negative-pressure includes supplying gas into the gas pocket through the gas channel to expand the protuberance in the negative-pressure action space of the chamber to create the negative-pressure in the negative-pressure action space, wherein removing the negative-pressure includes inhaling the gas from the gas pocket through the gas channel to contract the protuberance in the negative-pressure action space of the chamber to remove the negative-pressure in the negative-pressure action space.

Effects in accordance with the present disclosure may be as follows but may not be limited thereto.

The soft gripper according to the present disclosure may be able to implement and maintain sufficient adhesion to various surfaces by controlling a vacuum phenomenon in the chamber via expansion and contraction of the protuberance, and to easily control repeated attachment and detachment of the object thereto or therefrom.

Further, the soft gripper according to the present disclosure may implement and maintain sufficient adhesion in a dry environment as well as in the underwater environment.

Furthermore, the soft gripper according to the present disclosure may implement sufficient adhesion via expansion and contraction of the protuberance without an external pressure, and thus may be applied to various surfaces and pressure-sensitive materials.

In addition to the effects as described above, specific effects in accordance with the present disclosure will be described together with the detailed description for carrying out the disclosure.

BRIEF DESCRIPTIONS OF DRAWINGS

FIG. 1 is a cross-sectional view showing a configuration of a soft gripper according to an embodiment of the present disclosure.

FIG. 2 is an outer perspective view of the soft gripper shown in FIG. 1.

FIG. 7 is a graph showing adhesion measurement results based on presence or absence of a protuberance of a soft gripper according to an embodiment of the present disclosure.

FIG. 8 is a graph showing adhesion measurement results based on presence or absence of expansion of a protuberance of a soft gripper according to an embodiment of the present disclosure.

FIG. 9A is a graph showing adhesion measurement results based on elasticity of a soft gripper according to an embodiment of the present disclosure in a dry environment.

FIG. 9B is a graph showing adhesion measurement results based on elasticity of a soft gripper according to an embodiment of the present disclosure in an underwater environment.

FIG. 10A is a graph showing adhesion measurement results based on a time and a pneumatic pressure of a soft gripper according to an embodiment of the present disclosure in a dry environment.

FIG. 10B is a graph showing adhesion measurement results based on a time and a pneumatic pressure of a soft gripper according to an embodiment of the present disclosure in an underwater environment.

FIG. 11B is a graph showing a predicted value and an experimental value of each of an interfacial area and a chamber height of a soft gripper according to an embodiment of the present disclosure, based on an applied pressure.

FIG. 11D is a graph showing a predicted value and an experimental value of a pressure difference of a soft gripper according to an embodiment of the present disclosure in dry and underwater conditions, based on an applied pressure.

FIG. 12A is a graph showing a predicted value and an experimental value of an adhesive strength of a soft gripper according to an embodiment of the present disclosure in dry and underwater conditions, based on an applied pressure.

FIG. 12C is a graph showing an adhesive strength of a soft gripper according to one embodiment of the present disclosure in dry and underwater conditions, based on the number of activations/deactivations (on/off).

FIG. 13A is graph showing an adhesive strength of each of a soft gripper according to an embodiment of the present disclosure having a projection, a soft gripper according to one embodiment of the present disclosure having a smooth and flat coating, and a soft gripper without an improvement, based on a roughness of a surface.

FIG. 14 shows a process in which an object is adsorbed and transferred under water using a soft gripper according to an embodiment of the present disclosure.

DETAILED DESCRIPTIONS

Figure 3:
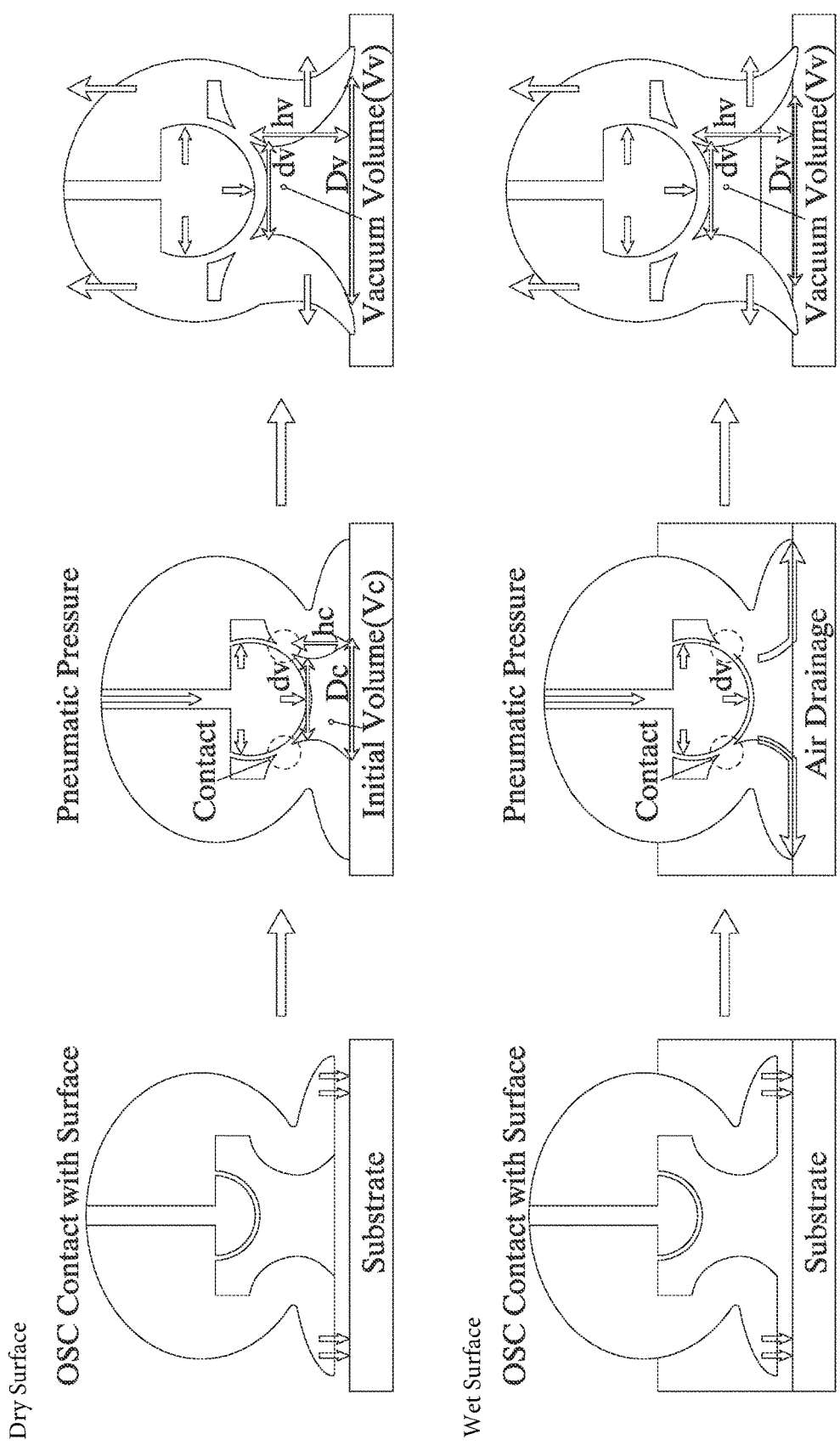
FIG. 3 is a view showing a process in which the soft gripper shown in FIG. 1 is adsorbed on a surface of an object submerged in water.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A gripping ability of a soft gripper according to the present disclosure depends on expansion and contraction of a protuberance 130 inside a soft gripper corresponding to muscle dynamics of a biologically corresponding sucker.

The soft gripper has notable adhesion performance in both dry (about 26 N) and (about 45 N) conditions as induced due to a pressure difference within a chamber 110, as well as exhibits high repeatability and response to switching between activation/deactivation of negative-pressure suction without an external physical element.

FIG. 1 is a cross-sectional view showing a configuration of a gripper (suction means) according to an embodiment of the present disclosure. FIG. 2 is an outer perspective view of the gripper shown in FIG. 1.

Referring to FIG. 1 and FIG. 2, the soft gripper according to an embodiment of the present disclosure may include a chamber 110, a sucker 120, a protuberance 130, and a gas channel 140.

The chamber 110 may have a negative-pressure action space 114 defined therein opening downwards. There is no particular limitation on a shape of the chamber 110. For example, the chamber 110 may include a planar top 111, a side portion 112 extending from the planar top 111 to form a partial portion of a sphere, and a bottom 113 opposite to the planar top 111 and located below the side portion 112.

The negative-pressure action space 114 may provide a space where the negative-pressure acts when the soft gripper adsorbs the object. An inner wall 114a of the negative-pressure action space 114 may be curved inwardly of the negative-pressure action space 114. Accordingly, a width of the negative-pressure action space 114 may be smaller from a top to a middle level and then may be larger from the middle level to a bottom.

The sucker 120 is adsorbed on a surface of the object. The sucker 120 may extend radially along a bottom of the chamber 110. In one example, the sucker 120 may extend radially from a center of the bottom 113 of the chamber 110. A gap defined in the sucker 120 may communicate with the negative-pressure action space 114, and accordingly air and water may be introduced into the negative-pressure action space 114 through the gap of the sucker 120.

The protuberance 130 may protrude downwards from a top face of the negative-pressure action space 114 and may be received in the negative-pressure action space 114. The protuberance 130 may be configured to act the negative-pressure in the negative-pressure action space 114. To this end, the protuberance 130 has elasticity and is expandable and contractible. The protuberance 130 may expand to generate the negative-pressure in the negative-pressure action space 114 and may contract to allow the negative-pressure in the negative-pressure action space 114 to be removed. In one example, the protuberance 130 may have a hemispherical shape. When the protuberance 130 has the hemispherical shape, the protuberance 130 may expand to a size to be in close contact with the curved inner wall 114a of the negative-pressure action space 114.

The gas channel 140 may pass through the chamber 110, that is, the planar top 111 of the chamber 110 to communicate with a gas pocket defined in the protuberance 130. The gas channel 140 may allow gas to be injected into the gas pocket so that the protuberance 130 expands, and allow the gas in the gas pocket to be discharged therefrom so that the protuberance 130 contracts.

The soft gripper according to an embodiment of the present disclosure may be made of one of a silicone plastic compound and a rubber-based polymer precursor. In one example, the soft gripper may be made of one selected from a group consisting of polydimethylsiloxane (PDMS), polyurethaneacrylate (PUA), polystylene (PS), polyvinyl alcohol (PVA), polyurethane, polyethylene glycol (PEG), and combinations thereof.

The protuberance 130 of the soft gripper expands during operation and thus contacts the inner wall 114a, thus leading to a structural change in the chamber 110. Following two main factors govern the adhesion of the soft gripper: (1) increased interfacial area and surface compliance, and (2) volume expansion causing reduction of an internal pressure of the chamber 110 of the soft gripper.

FIG. 3 is a diagram illustrating a process in which the gripper according to the present disclosure as shown in FIG. 1 is adsorbed on the surface of the object in a dry environment and an underwater environment.

In an example of a dry surface as show in an upper portion of FIG. 3, a first picture shows a gripper resting on a contact surface. A second picture shows a state in which the protuberance expands via injection of the gas from the gas channel thereto and thus contacts the curved portion of the inner wall. A third picture shows that the gripper rises upward by further expanding the protuberance to push the curved portion of the inner wall further outwardly. In the third picture, a volume defined by the protuberance, the inner wall and the contact surface is larger than that in the second picture and thus a more depressurized negative-pressure is generated, thereby implementing stronger adhesion.

An example of a wet surface environment is shown in a lower portion of FIG. 3. A first picture of the wet surface environment shows the gripper resting on the contact surface in an underwater environment. A second picture shows a state in which the protuberance expands via injection of the gas from the gas channel thereto and thus contacts the curved portion of the inner wall. A third picture shows that the gripper rises upward by further expanding the protuberance to push the curved portion of the inner wall further outwardly. In the second picture, a volume defined by the protuberance, the inner wall, and the contact surface is full of water, so that is difficult to generate the negative-pressure in the space 114 and to implement adhesion in the underwater environment. However, according to the present disclosure, in the third picture, the volume defined by the protuberance, the inner wall, and the contact surface becomes larger such that a vacuum is generated in the space 114, thereby to create a very strong negative-pressure therein which provides a very strong adhesion even in the aquatic environment.

When an operator wants to detach the gripper according to the present disclosure from the contact surface of the object, the gas is discharged outwardly from the gas pocket defined in the protuberance 130, such that the protuberance 130 contracts to remove the force to press the curved inner wall. Thus, the gripper is lowered and thus the volume defined by the protuberance, the inner wall, and the contact surface is smaller such that the negative-pressure is removed and thus the griper is detached from the object.

Gripping Mechanism of Soft Gripper

Figure 11A:
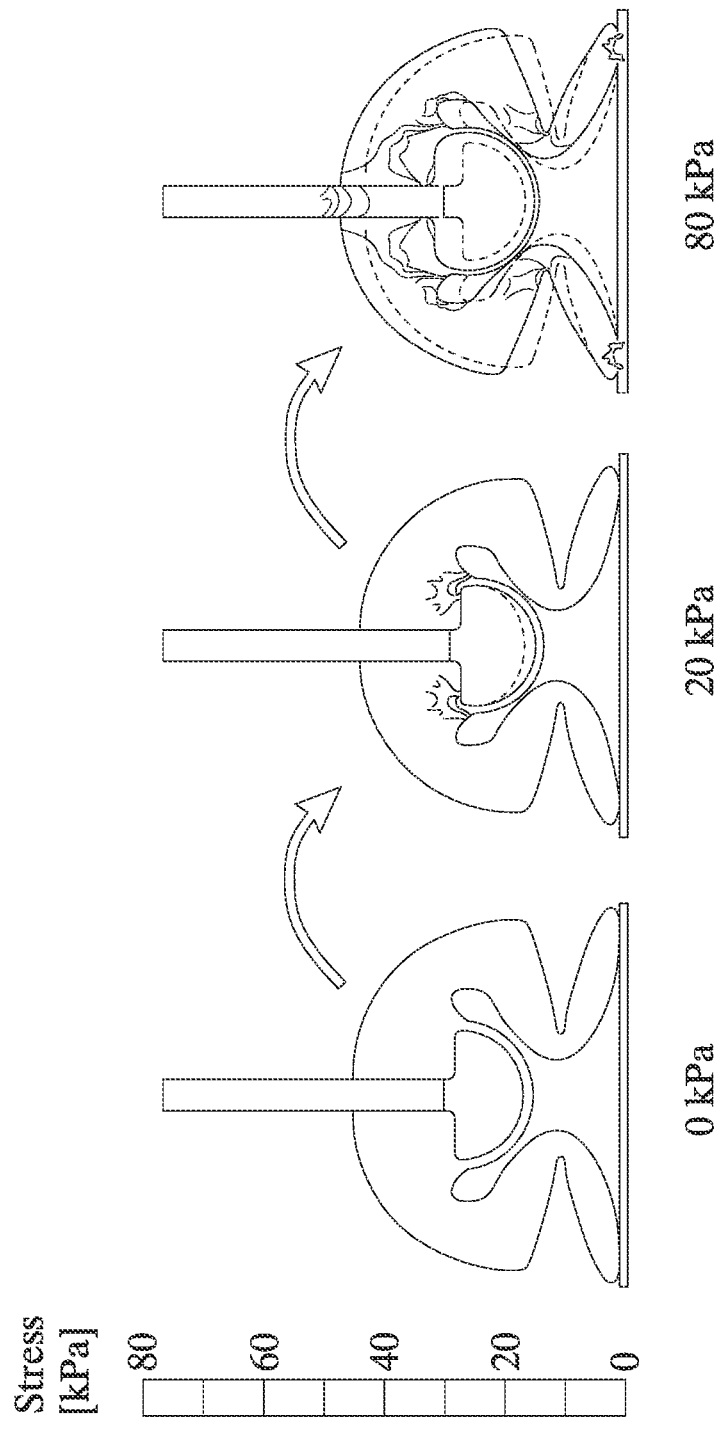
FIG. 11A is a FEM simulation image of a soft gripper according to an embodiment of the present disclosure during negative-pressure suction.

To describe a specific gripping mechanism of the soft gripper in accordance with the present disclosure, first, change in a geometry of the soft gripper was investigated during suction. An increase in an interfacial area and the chamber height as shown in FIG. 3 was measured based on change in an input pneumatic pressure. The change was measured in each of a deactivated state (0 kPa: input pneumatic pressure), an initial contact between the inner wall 114a of the chamber 110 and a swollen protuberance 130 (20 kPa), and a full activated state of the soft gripper (80 kPa) using a finite element method (FEM) simulation, and the measurements were compared to each other. The FEM simulation is shown in FIG. 11A. Based on papers (S. Licht, E. Collins, D. Ballat-Durand, M. Lopes-Mendes, Universal jamming grippers for deep-sea manipulation, in OCEANS 2016 MTS/IEEE Monterey (IEEE, 2016), pp. 1-5, and Z. E. Teoh, B. T. Phillips, K. P. Becker, G. Whittredge, J. C. Weaver, C. Hoberman, D. F. Gruber, R. J. Wood, Rotary-actuated folding polyhedrons for midwater investigation of delicate marine organisms. Sci. Robot. 3, eaat5276 (2018)), a total suction force ($F_s$) of the soft gripper in water may be expressed as $F_s=-PA$, where P denotes a pressure difference between a pressure $P_v$ inside the chamber 110 and an atmospheric pressure ($P_0$: about 101.3 kPa), and A denotes an interfacial area subjected to the suction effect. Based on FIG. 3, $A=\pi D_v^2/4$, where $D_v$ denotes a diameter of the interfacial area when a vacuum is established inside the chamber 110.

First, the soft gripper approaches a specific surface and contacts the surface. Under the dry condition, a difference between an internal pressure in the gripper and an external pressure thereto is defined based on a volume change inside the chamber 110 as follows:

$$F_{s,dry}=\pi D_v^2/4*P_0(1-V_0/V_v) \quad (1)$$

In this connection, $V_0$ denotes a volume of the inner space of the chamber 110 upon contact between the inner wall 114a and the protuberance 130 during the initial stage of the negative-pressure suction, and $V_v$ denotes a volume of the inner space of the chamber 110 in a vacuum state.

However, under the underwater condition, the pressure difference is calculated in a different manner from that under the dry condition. As shown in FIG. 3, residual air is substantially completely exhausted from the chamber 110 during the initial stage of the negative-pressure suction. This causes an extremely low pressure inside the chamber to allow creation of a substantially vacuum state even at minimal volume change. In this connection, $P_v$ is about 0, such that the pressure difference between an internal pressure of the soft gripper and an external pressure thereto is maximized and may be expressed as $\Delta P_{max}=-P_0$. For this reason, a suction force ($F_{s,UW}$) of the soft gripper in the aquatic condition is expressed as follows:

$$F_{s,UW}=-\Delta P_{max}(\pi D_v^2/4) \quad (2)$$

FIG. 11B shows predicted and experimental values of each of the interfacial area and the chamber height during injection of the pneumatic pressure into the gas pocket, as measured using a compact laser displacement measurement sensor (CD22-15VM12; Fastus, Japan) and a caliper (Vernier scale). The increase in the interfacial area and the chamber height is measured to understand the expansion of the volume of the chamber 110 of the soft gripper causing the decrease in the internal pressure in the chamber 110. During the activation of the gripper, the interfacial area change is negligible upon the input of a low pneumatic pressure <20 kPa. Upon the injection of the higher pressure >20 kPa, the swollen protuberance 130 contacts the inner wall 114a of the chamber 110 of the soft gripper. This expands the interfacial area of the sucker 120 to form a curved interface to help adapt against a rounded surface. Similarly, the height of the soft gripper decreases slightly during start of the expansion, but increases steadily as the soft gripper displaces away from a base. Because behaviors of the interfacial area and the height of the chamber 110 in the experimental observation are not identical with those in the FEM simulation, theoretical and experimental changes in the volume based on varying pneumatic pressure as injected were calculated. An interior of the chamber 110 was assumed to have a truncated cone, and the volume change $\Delta V=(V_0-V_v)$ of the inner space of the chamber 110 before and after the negative-pressure suction may be expressed as follows.

$$\Delta V=\pi/12*[h_0(d_0^2+d_0D_0+D_0^2)-h_v(d_v^2+d_vD_v+D_v^2)] \quad (3)$$

where $d_0$ denotes a diameter of an upper portion of the interior of the chamber 110 during the initial contact, $D_0$ denotes a diameter of the interfacial area of the chamber 110 of the soft gripper during the initial contact, and $h_0$ denotes a height of the chamber 110 during the initial contact. In addition, $d_v$ denotes a diameter of the upper portion of the interior of the chamber 110 in a vacuum state, $D_v$ denote a diameter of the interfacial area in the vacuum state, and $h_v$ denotes a height of the chamber 110 in the vacuum state.

Figure 11C:
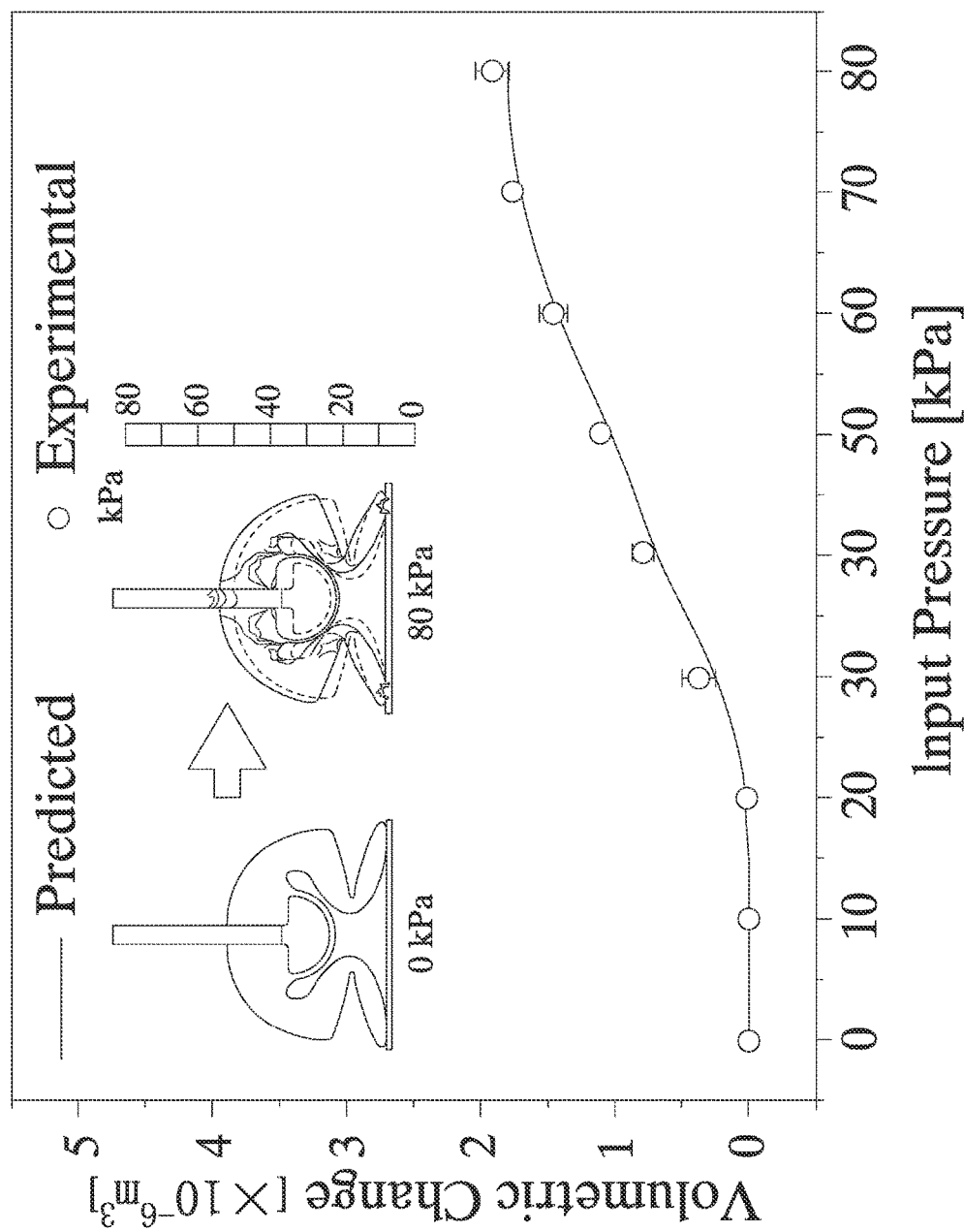
FIG. 11C is a graph showing a predicted value and an experimental value of a volume of a soft gripper according to an embodiment of the present disclosure, and a FEM simulation image thereof, based on an applied pressure.

As shown in FIG. 11c, the predicted and experimental values of the volume of the chamber 110 of the soft gripper are the same. Upon the negative-pressure suction above 20 kPa, the expansion of the soft gripper increasing the interfacial area and the height of the chamber 110 causes a steady increase in the internal volume of the chamber. As the applied pressure increases to 80 kPa, the interfacial area and the height of the chamber 110 of the soft gripper stopped increasing, and thus, the volume of the soft gripper is maximized. The predicted value of the volume change is then used to calculate the pressure difference between the internal pressure of the soft gripper and the external pressure thereto. A customized device was used to measure the pressure in the chamber 110 of the soft gripper. Then, a calculated result was compared with the experimental value of the measured pressure difference. As shown in FIG. 11d, a theoretical result of the pressure difference between the internal pressure of the chamber 110 of the soft gripper and the external pressure thereto is identical with an experimental result thereof, based on varying applied pressure.

Analyzing the pressure difference between the internal pressure of the chamber 110 of the soft gripper and the external pressure thereto may allow measuring the adhesive strength of the soft gripper corresponding to the input of the varying pneumatic pressure in the dry condition (FIG. 12A). In this connection, all experiments for the adhesive strength were performed using customized equipment under the ambient drying condition. The experimental value of the adhesive strength is consistent with the predicted value thereof. This may be explained based on the agreement between the experimental and predicted values of the pressure difference between the internal pressure of the chamber 110 of the soft gripper and the external pressure thereto upon increase in the input pneumatic pressure. As shown in FIG. 12A, the dry adhesive strength of the soft gripper is maximized to about 26 at an applied pressure of 80 kPa due to the maximized pressure difference between the internal pressure of the chamber 110 of the soft gripper and the external pressure thereto and the maximized interfacial area of the sucker 120. Using a similar experimental setting, we compare theoretical and experimental adhesive strengths of the gripper to a flat substrate submerged in water with each other. Likewise, as shown in FIG. 12A, the soft gripper reaches a maximum adhesive strength of about 45 N at 80 kPa of the input pneumatic pressure, due to a much greater pressure difference between the internal pressure of the chamber 110 of the soft gripper and the external pressure thereto via the formation of the vacuum.

FIG. 9A and FIG. 9B show the adhesive strength of the soft gripper based on the elastic modulus of the soft gripper according to the switching of activation and deactivation of the injection of the pneumatic pressure in dry/underwater environments, respectively. In order to manufacture the soft gripper, silicone elastomers having different elastic modulus, specifically, Ecoflex 10 (E: about 10 kPa), Ecoflex 30 (E: about 30 kPa), Ecoflex 50 (E: about 50 kPa), and Dragonskin 10 (E: about 300 kPa) were used. In this connection, the activated state is similar to the injection of the pneumatic pressure (20 to 80 kPa), while the deactivated state is similar to the complete air discharge from the soft gripper. Then, the adhesive strength was measured in order to understand the firmness of the adhesion during the activated state and the separation during the deactivated state. Under the dry and underwater conditions, the soft gripper exhibits an increase in normal adhesive strength as the elastic modulus increases. This is because the adhesive strength ($F_N$) has an inverse proportional relationship with a square root of a system compliance (C) ($F_N$=about $\sqrt{(A/C)}$), where E is the elastic modulus of the adhesive interface, and C is about 1/E, and A is an interfacial area of the soft gripper.

Generally, the normal adhesion of the soft gripper increases as rigidity increases in both dry and underwater conditions. However, the soft gripper made of silicon with a larger E may not be manufactured using a copying method according to the present disclosure. Conversely, in the deactivated state, the volume of the chamber 110 of the soft gripper returns to an initial state thereof, and a contact of the sucker 120 returns to an original state via the elastic restoring force of the silicone material. This destroys a seal between the soft gripper and the substrate in close contact therewith. Due to the greater recovery behavior of the silicone, the greater adhesive strength of the softer gripper is achieved.

Figure 12B:
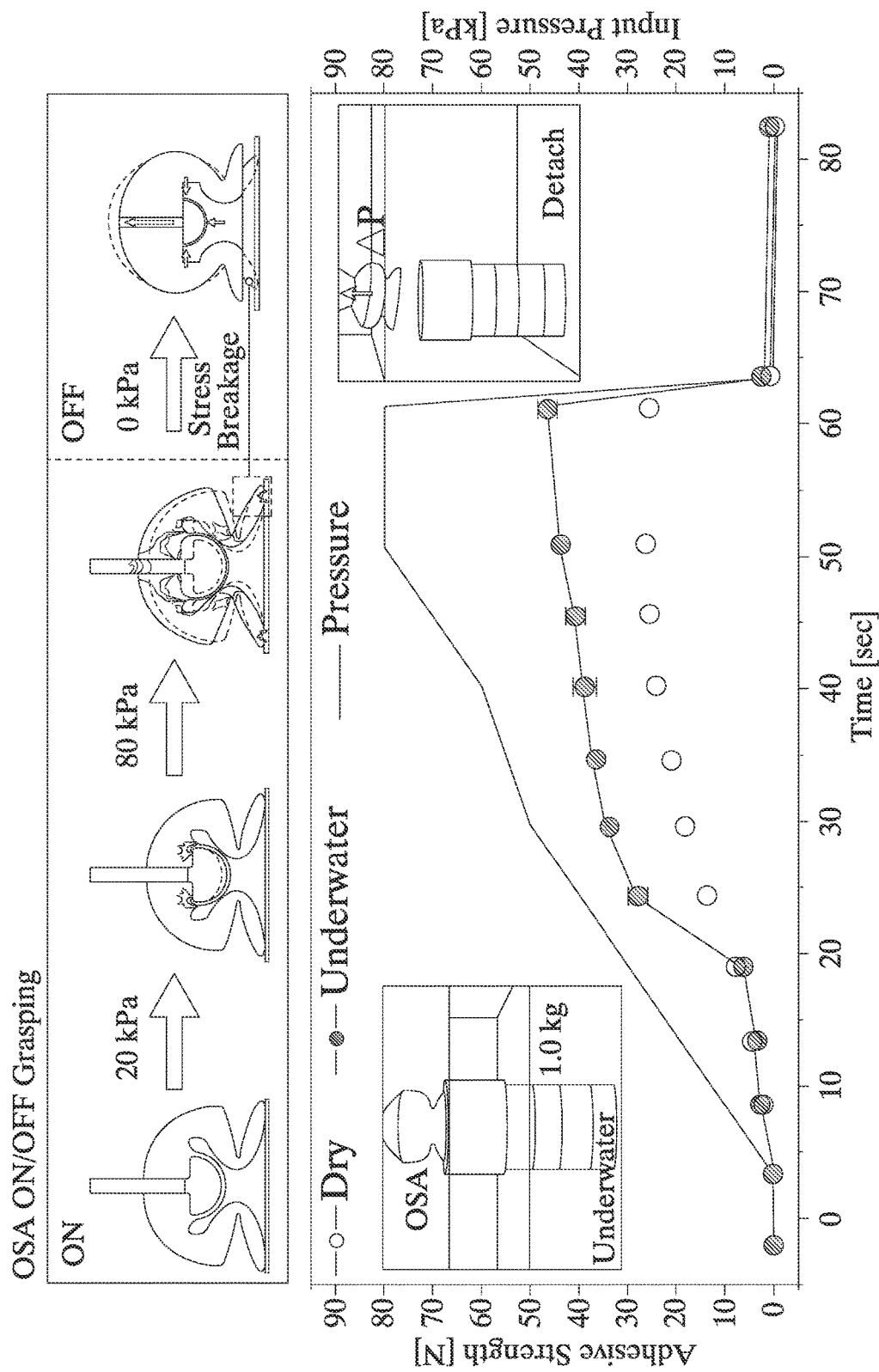
FIG. 12B is a graph showing an adhesive strength of a soft gripper according to one embodiment of the present disclosure, an applied pressure thereto, and a FEM simulation image thereof in dry and underwater conditions and over time.

FIG. 12B summarizes general attachment and detachment behavior of the soft gripper. The expansion of the volume of the chamber 110 of the soft gripper initiates adhesion via the suction effect, while the expansion of the interfacial area makes it possible to increase the adhesion corresponding to the input of the pneumatic pressure in the range of 20 to 80 kPa. Because of the vacuum state in the chamber 110, the soft gripper establishes a greater pressure difference under the underwater condition and yields much greater adhesive strength, as opposed to the adhesion under the dry condition. When the air from the protuberance 130 is released, the stress is removed at the contact area, thereby causing separation of the soft gripper from the surface of the object. In FIG. 12B, the soft gripper is firmly attached to an object of a 1 kg weight in water (pneumatic pressure of about 30 kPa), and transfers the object and detaches therefrom immediately when most of the air is released from the protuberance 130. Thus, the soft gripper achieves the maximum normal adhesion of about 26 N in the dry condition and the maximum normal adhesion of about 45 N in the underwater condition, and is detached from the object immediately when the air is released from the protuberance 130.

The ability of the soft gripper to attach to and detach from the object is easily controlled based on the pneumatic pressure, and thus is highly suitable for gripping the object in the dry and underwater environments. After the negative-pressure suction of the soft gripper, the gripper body is raised up while firmly adhering to the substrate as the object during the bonding process. When the air is discharged from the protuberance 130, a seal between the soft gripper and the surface of the substrate is removed, so that the gripper is immediately separated therefrom.

To test the durability of the gripping ability of the gripper, repeated adhesions of the soft gripper in the dry/underwater environment were tested based on on/off (activation/deactivation) switching, as shown in FIG. 12C. The soft gripper exhibits up to 10000 times firm, stable, and long-term adhesions in the activated state in both the dry and underwater environments, as well as high response of the immediate separation from the substrate as the object in the deactivated state in both the dry and underwater environments.

In addition, we arrange highly soft projections on the surface of the sucker 120 of the soft gripper to improve adhesion compliance for gripping an irregularly shaped object. The projections are manufactured via a simple stamping method using a polymer master having a reverse structure and a much softer derivative of the silicone elastomer (Ecoflex 10). The projections are densely distributed on the surface of the sucker 120 having high structural fidelity and completeness. For maximized adhesion properties, the hierarchical structures of the projections are designed to have a diameter of 30 µm and a spacing ratio of about 1, as well as a geometry of biological projections The spacing ratio is obtained by dividing a distance between structures by a width of each structure. In the underwater condition, we then measure the adhesive strength of a soft gripper (soft gripper-SM) to the substrate having a varying roughness, wherein the soft gripper-SM has highly soft projections on the surface of the sucker 120 whose a roughness is defined by a mean square root (RMS) roughness expressed as $R_{RMS}=\sqrt{(1/n\Sigma_{i=1}^{n}*y_i^2)}$. $R_{RMS}$ is used for data consistency. In this connection, a substrate having $R_{RMS}$ of about 100 µm has an $R_{Max}$ of about 160 µm, while a substrate having $R_{RMS}$ of 30 µm has a maximum roughness $R_{Max}$ of about 80 µm.

The measurement is carried out upon complete negative-pressure suction at input of 80 kPa pressure and then a measured value is compared to that of a coated soft gripper sample (soft gripper-SF) having a smooth and flat surface and to that of a soft gripper sample without further improvement. The soft gripper-SM exhibits a slight increase in the normal adhesion to the flat substrate due to interactions of the projections with the substrate. Specifically, a very small-scale structure, that is, the fine projection allows the improved adhesion interface and causes suction against the contact surface via the stretch of the inner wall 114a for creation of the vacuum of the negative-pressure action space 114 and. Moreover, a capillary bridge is formed between the projections and the contact surface, thereby to improve the sealing between the sucker 120 and the contact surface and to contribute to the overall adhesion of the projections. In particular, the adhesion of the hierarchical structures of the projections to the surface of the substrate having the varying roughness demonstrates the effect of the projections on improved surface adaptability. Irregular features of the substrate may hinder the contact and sealing between the soft gripper without the further enhancement and the contact surface of the substrate, and thus weaken the adhesion performance of the soft gripper without the further enhancement.

However, as shown in FIG. 13a, the soft gripper-SM exhibits a highly robust and normal adhesion to the surface with $R_{RMS}$ of each of 30 μm and 100 μm, due to the uniform contact of the highly smooth projections. This performance is not achieved in the soft gripper-SF and the soft gripper without the further enhancement, which exhibit a substantial decrease in adhesive properties thereof as the roughness of the contact surface of the substrate increases. Thus, the soft gripper-SM having the interactions of the hierarchical structures of the projections to allow the improved suction and to create the capillary force has a remarkable adhesion ability to the rough surface.

Figure 13B:
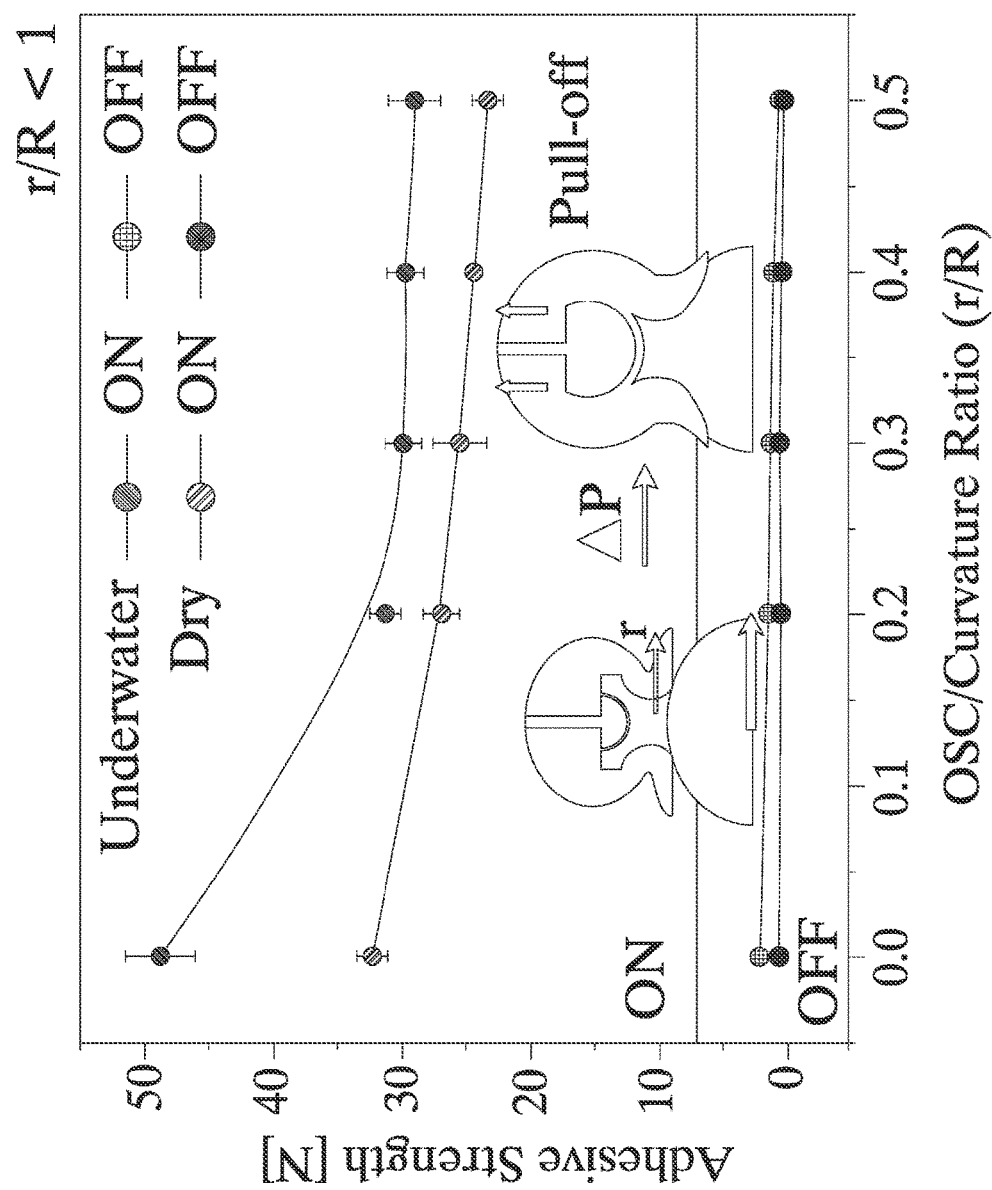
FIG. 13B is a graph showing an adhesive strength of a soft gripper according to an embodiment of the present disclosure in dry and underwater conditions, based on a ratio of a surface curvature relative to the soft gripper (r/R).

Further, as shown in FIG. 13B, the adhesive strength of the soft gripper-SM to the substrate having the varying curvature as defined by a soft gripper-to-surface curvature ratio (OSC/curvature ratio) (r/R) under the dry and aquatic environments was measured. The soft gripper-SM achieves adaptation to the geometry and obtains solid suction to the target surface due to the change in the adhering interface resulting from the increase in the input pressure during the activation of the soft gripper. First, the pneumatic pressure is applied so that a curvature of the sucker 120 of the soft gripper-SM and the projections thereon coincide with the curvature of the curved surface of the object such as the substrate. Subsequently, additional injection of the pressure establishes a pressure difference within the internal pressure of the chamber 110 and the external pressure thereto, resulting in suction-based attachment to the substrate. Upon transitioning the activated state to the deactivated state, the soft gripper-SM immediately separates from the substrate in both the dry and underwater conditions because the seal between the substrate surface and the sucker is easily removed due to the curvature.

To demonstrate the gripping and transporting ability of the object with different geometries and shapes by the present soft grippe with the improved attachment ability due to the highly smooth projections under the underwater environment, a commercial robot manipulator OpenMANIPULATOR-X RM-X52-TNM, ROBOTIS and the present soft gripper are integrated with each other. Using the integration, we demonstrates the practical application of the soft gripper according to an embodiment of the present disclosure. When using the soft gripper-SM to realize the negative-pressure based adsorption, the soft gripper-SM exhibits easy attachment to a flat, brittle silicon wafer. The manipulator may easily handle the wafer for various motions and twists, and may then move the wafer to a glass petri dish. No surface contamination or damage of the wafer was observed upon separation between the gripper and the wafer. As the soft gripper-SM swells, the sucker 120 is deformed to conform to the curvature of the water as the object and to allow the projections to establish uniform contact with the rough surface. Additionally, the grip ability of the soft gripper-SM to grip a relatively soft object in the humid condition may easily establish adhesion to a curved surface. After the soft gripper-SM is adhered to the object via the negative-pressure based suction, the soft gripper-SM may be separated from the object immediately when air is released from the protuberance.

Figure 5:
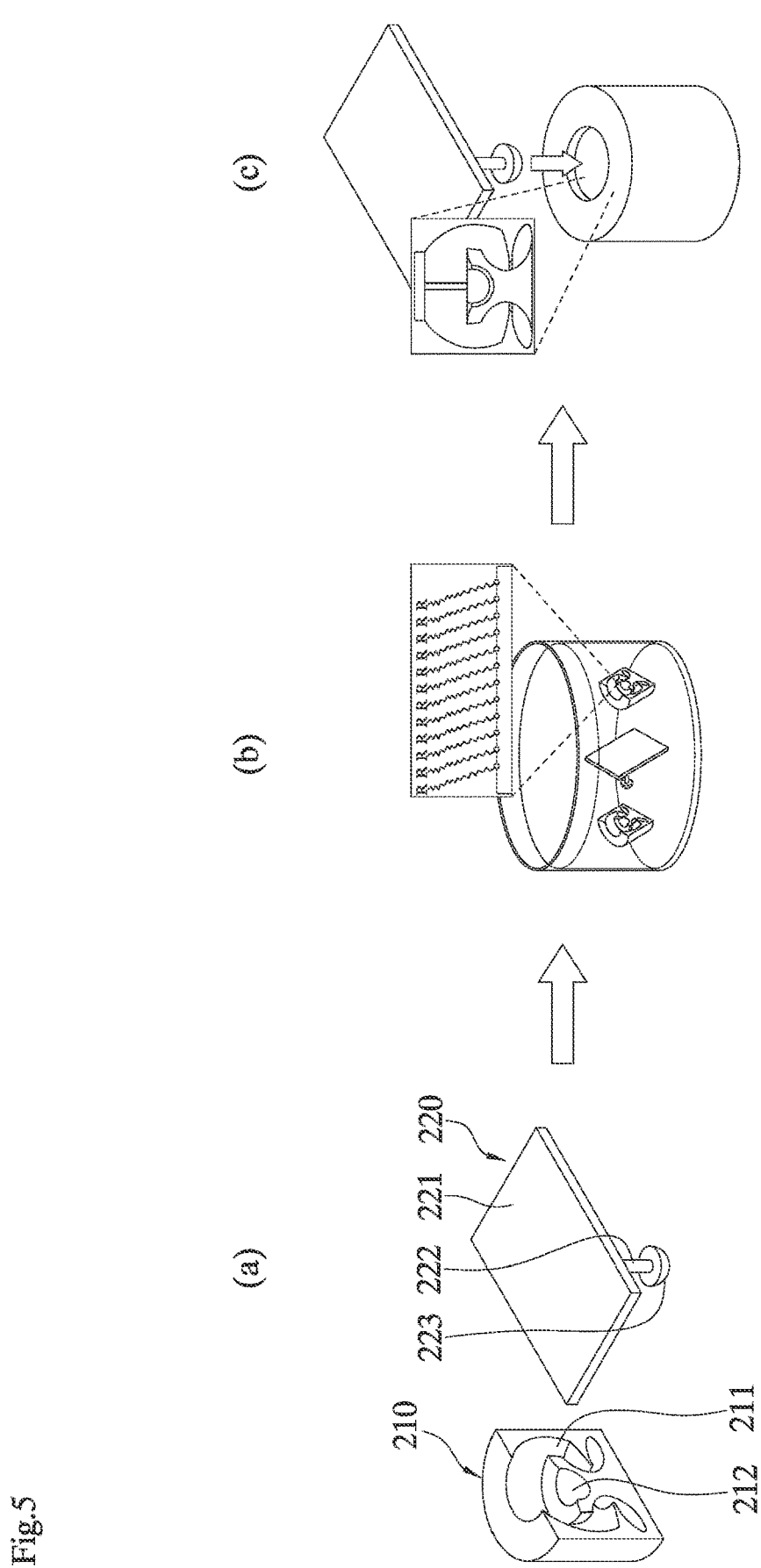
FIG. 5 is a view showing a process of a manufacturing method of a soft gripper according to an embodiment of the present disclosure.

The soft gripper according to an embodiment of the present disclosure may be manufactured using a forming mold assembly. The forming mold assembly may include a first mold 210 and a second mold 220 as shown in FIG. 5. The first mold 210 and the second mold 220 are shown in FIG. 5.

The first mold 210 may include a first polymer receiving groove 211 and a second polymer receiving groove 212. The first polymer receiving groove 211 may have a three-dimensional shape corresponding to a combination of outer shapes of the chamber 110 and the sucker 120 of the soft gripper. The second polymer receiving groove 212 may be located in a central upper location of the first polymer receiving groove 211. The second polymer receiving groove 212 may have a hemispherical shape.

The second mold 220 may include a cover 221, a gas channel forming portion 222, and a protuberance forming portion 223. The cover 221 may have a rectangular plate shape having a size to cover the first mold 210. The gas channel forming portion 222 may extend in a column shape from a bottom surface of the cover 221. The protuberance forming portion 223 may be disposed at a distal end of the pillar shape of the gas channel forming portion 222 and have a shape corresponding to a shape of the second polymer receiving groove 212.

The first mold 210 and the second mold 220 may be manufactured using 3D printing or photolithography. The 3D-printed first mold 210 and the 3D-printed second mold 220 may be designed using a 3D CAD (computer-aided design) software (Autodesk Fusion 360, Autodesk Inc., CA, USA).

Parafilm is used to fix the two molds to each other.

Figure 4:
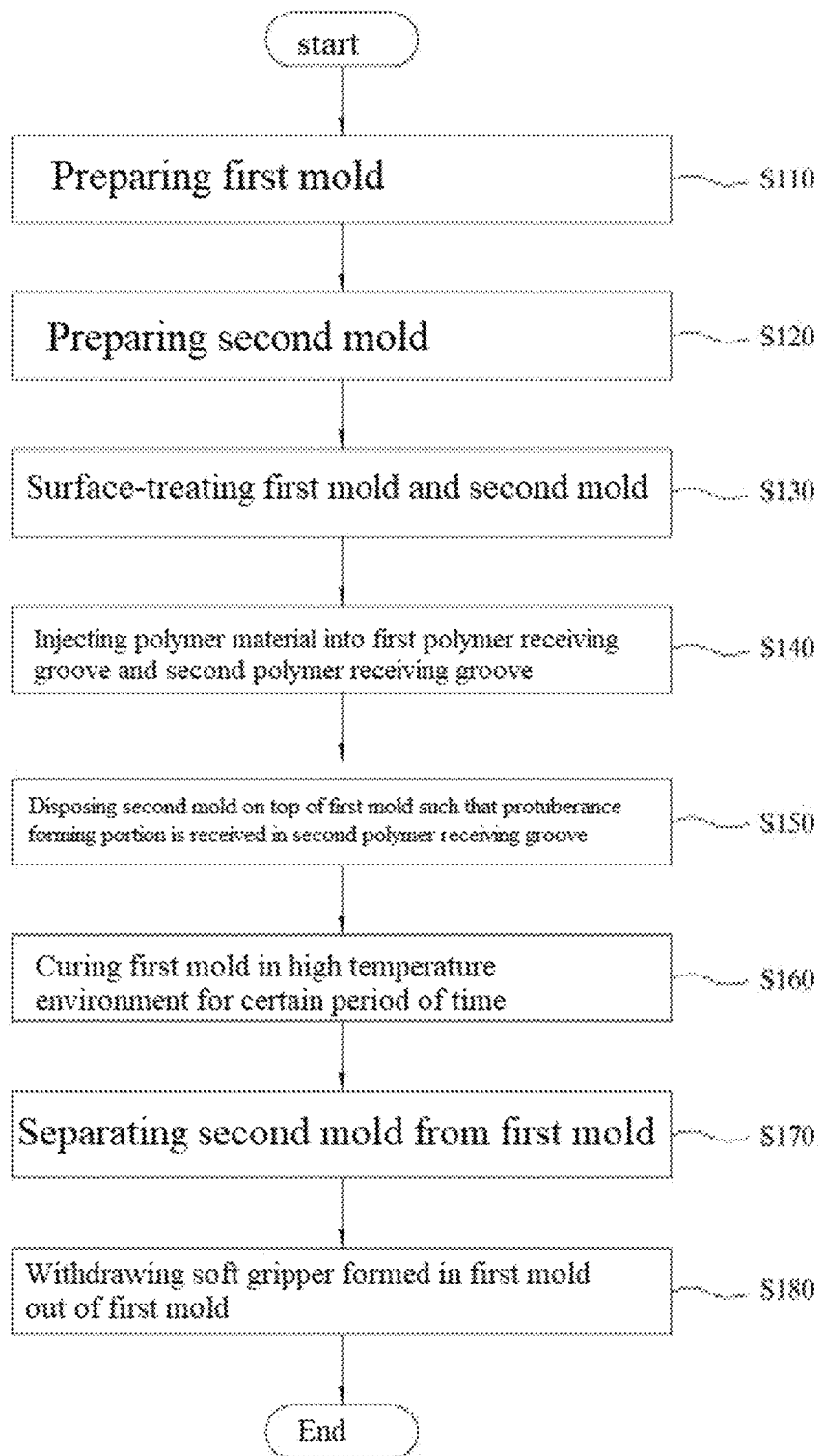
FIG. 4 is a flow chart showing a process sequence of a manufacturing method of a soft gripper according to an embodiment of the present disclosure.

FIG. 4 is a flow chart showing a process sequence of a manufacturing method of the soft gripper according to an embodiment of the present disclosure. FIG. 5 is a view showing a process of a manufacturing method of the soft gripper according to an embodiment of the present disclosure.

Referring to FIG. 4 and FIG. 5, the manufacturing method of the soft gripper according to an embodiment of the present disclosure may include a step S110 of preparing the first mold 210; a step S120 of preparing the second mold 220; a step S130 of surface-treating the first mold 210 and the second mold 220; a step S140 of injecting a polymer material into the first polymer receiving groove 211 and the second polymer receiving groove 212; a step S150 of disposing the second mold 220 on top of the first mold 210 such that the protuberance forming portion 223 is received in the second polymer receiving groove 212; a step S160 of curing the first mold 210 in a high temperature environment for a certain period of time; a step S170 of separating the second mold 220 from the first mold 210; a step S180 of withdrawing a soft gripper formed in the first mold 210 out of the first mold 210.

Specifically, in order to manufacture the soft and expandable portion of the soft gripper, a silicone elastomer (Dragon Skin 10, Smooth-On Inc) was mixed with a curing agent at a 1:1 ratio, thereby to obtain silicone elastomer prepolymer which in turn was degassed in a vacuum chamber for 10 minutes. After the degassing, the prepolymer mixture was deposited into a lower mold to deposit a silicon precursor (Dragon Skin10). Then, an upper 3D-printed mold was assembled with the lower mold to form the protuberance 130. The prepolymer was cured at room temperature for 4 hours and was removed from the mold assembly. Then, the formed soft expandable portion as the protuberance was attached to a 3D-printed base gripper body using silicone adhesive (Sil-Poxy, Smooth-On Inc.). Thus, the soft gripper was completed.

In FIG. 5, (a) represents a state of the step S110 and the step S120, (b) represents a state of the step S130, and (c) represents a state of the step S140.

In one example, the step S130 of the surface treatment of the first mold and the second mold may include soaking the first mold and the second mold in a self-assembled monolayer (SAM) solution (trichloro(octadecyl)silane: ODTS, Sigma-Aldrich Inc.) as diluted to 1% using hexane, for 50 to 70 minutes; and drawing out the first mold and the second mold out of the solution and curing the first and second molds in an oven of 50 to 70° C. for 11 to 13 hours.

In one example, the polymer may be selected from a group consisting of polydimethylsiloxane (PDMS), polyurethaneacrylate (PUA), polystyrene (PS), polyvinyl alcohol (PVA), polyurethane, polyethylene glycol (PEG), and combinations thereof.

The projections may be imprinted on the surface of the sucker 120 of the soft gripper as manufactured as described above.

A SAM-treated PDMS master was first attached to a glass substrate. Highly soft silicone elastomer prepolymer (Ecoflex 10, Smooth-On Inc.) was deposited on the PDMS master, followed by spin-coating at 200 rpm for 1 minute. The soft gripper was then carefully moved on the spin-coated PDMS master, so that the sucker 120 only contacted a very small pattern. After curing for 4 hours at room temperature, the soft gripper was removed from the PDMS master such that the projections were implanted onto the sucker 120 of the soft gripper.

Hereinafter, specific examples and test examples according to the present disclosure will be described. However, the following examples are only some implementations according to the present disclosure. Thus, the scope of the present disclosure is not limited to the following examples.

Present Example 1

The first mold 210 and the second mold 220 were prepared, and the first mold 210 and the second mold 220 were immersed in the self-assembled monolayer (SAM) solution for 60 minutes, and then cured in an oven at 60° C. for 12 hours for the surface treatment. Then, liquid polyurethane acrylate (PUA) (or PDMS) as the UV curable polymer material was injected into the first polymer receiving groove 211 and the second polymer receiving groove 212 of the first mold 210. Then, the second mold 220 was disposed on top of the first mold 210 so that the protuberance forming portion 223 was inserted into the second polymer receiving groove 212, and then curing was performed for 2 hours using UV. Subsequently, the second mold 220 was separated from the first mold 210, and then the soft grippe formed by curing the polymer material was taken out from the first mold 210.

Geometric Measurement Method of Soft Gripper

To measure the change of the height of the chamber 110 of the soft gripper, a compact laser displacement measurement sensor (CD22-15VM12, Fastus, Japan) attached to an elevated platform was used. Laser from the sensor was irradiated to the protuberance 130 using a 3D printed model. The pneumatic pressure was increased from 0 kPa to 80 kPa by an increment unit of 10 kPa using an electric pressure calibrator (719Pro, Fluke Inc) and was injected into the gas pocket of the protuberance 130. The displacement of the protuberance 130 was measured. Measurements of an inner diameter $D_i$ and an outer diameter $D_o$ of the sucker 120 of the soft gripper, as well as a diameter of the swollen protuberance 130 $d$ were performed using a caliper (Vernier scale).

Pressure Measurement in Chamber of Gripper

The soft gripper sample was placed into a 3D-printed stand to enable both activation/deactivation measurement of the soft gripper from a top of the stand and pressure measurement within the chamber 110 of the soft gripper from a bottom of the stand. A pressure sensor (40PC001B1A Honeywell Inc.) having an injection tube was connected to a bottom of the stand, while applying the varying pneumatic pressure using an electric pressure calibrator. The pneumatic pressure was increased from 0 kPa to 80 kPa by an increment unit of 10 kPa and was injected to the gas pocket in the protuberance 130 in the chamber 110. Thus, a change in the pressure in the chamber 110 was observed using an oscilloscope and based on change in voltage output.

Adhesion Measurement of Soft Gripper

All normal adhesion tests were performed on flat, rough, and curved s-PUA substrates (area: about 5×5 $cm^2$) in a dry condition of about 50% relative humidity and in an aquatic condition, using customized equipment (adhesion tester, Neo-Plus, Korea). To perform measurements in the underwater condition, the s-PUA substrate was immersed in distilled water. Thereafter, the soft gripper sample was fixed to a jig and was connected to an electric pressure calibrator through a tube. The electric pressure calibrator was used to ensure activation of the soft gripper based on the specific value of the applied pressure. The soft gripper first contacted the substrate having a negligible preload. When a specific pneumatic pressure was injected into the protuberance 130, the soft gripper adheres to the substate until the gripper sample was completely separated from the substrate. The lowest peak of the normal adhesive profile determined the adhesive strength of the soft gripper. The adhesion performance to the PUA substrate was substantially similar to that to the glass or silicone substrate. All measurements were repeated at least 10 times and an average value thereof was obtained.

Adhesion Measurement Based on Environmental Conditions

Figure 6:
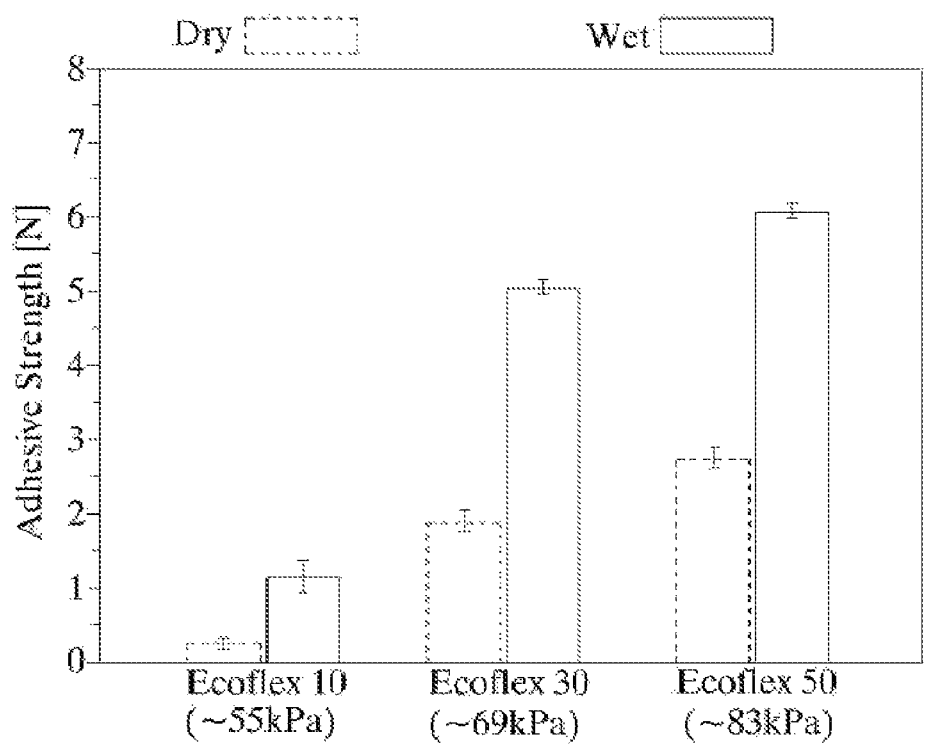
FIG. 6 is a graph showing adhesion measurement results based on environmental conditions of a soft gripper according to an embodiment of the present disclosure.

FIG. 6 is a graph showing adhesion measurement results based on environmental conditions of a soft gripper according to an embodiment of the present disclosure.

The soft gripper of Present Example 1 was attached onto the silicon substrate. The adhesion thereof was measured in each of the dry and underwater conditions. As a result, as shown in FIG. 6, it may be identified that the adhesion thereof in the underwater state is about 2 times higher than that in the dry state.

Comparative Example

In Comparative Example to the soft gripper according to Present Example 1, a soft gripper free of the protuberance 130 was manufactured.

Adhesion Measurement Based on Presence or Absence of Protuberance

FIG. 7 is a graph showing adhesion measurement results based on presence or absence of the protuberance 130 of a soft gripper according to an embodiment of the present disclosure.

When attaching the soft gripper according to Present Example 1 and the soft gripper according to Comparative Example onto the silicon substrate in water, the adhesions thereof were measured. As a result, as shown in FIG. 7, it may be identified that the adhesion (a) of Present Example 1 is significantly higher than that (b) of Comparative Example.

Adhesion Measurement Based on Presence or Absence of Protuberance Expansion

FIG. 8 is a graph showing adhesion measurement results based on presence or absence of expansion of the protuberance 130 of the soft gripper according to an embodiment of the present disclosure.

The soft gripper according to Present Example 1 was attached onto the silicon substrate in water. The pneumatic pressure was injected into the protuberance 130, and thus the protuberance 130 expanded. In this case, the adhesion (a) thereof was measured. To the contrary, the soft gripper was adhered to the substrate only using a vertical pressure without the injection of the pneumatic pressure to the protuberance 130. In this case, the adhesion (b) thereof was measured. As a result, as shown in FIG. 8, it may be identified that the adhesion (a) is higher than the adhesion (b).

Adhesion Measurement Based on Elasticity of Soft Gripper

FIG. 9A is a graph showing adhesion measurement results based on the elasticity of the soft gripper according to an embodiment of the present disclosure in a dry environment. FIG. 9B is a graph showing adhesion measurement results based on the elasticity of the soft gripper according to an embodiment of the present disclosure in an underwater environment.

The soft gripper was manufactured according to Present Example 1, except that four soft grippers having different elastic moduli were manufactured. The four soft grippers had the elastic moduli of 10 kPa, 30 kPa, 50 kPa, and 70 kPa, respectively. Adhesion of each of the soft grippers was measured when attaching each gripper to the silicon substrate. The adhesion was measured in a dry environment and an underwater environment. As a result, as shown in FIG. 9a and FIG. 9b, it may be identified that the higher the elastic modulus, the greater the adhesion.

Adhesion Measurement Based on Time and Pneumatic Pressure

FIG. 10A is a graph showing adhesion measurement results based on a time and a pneumatic pressure of a soft gripper according to an embodiment of the present disclosure in a dry environment. FIG. 10B is a graph showing adhesion measurement results based on a time and a pneumatic pressure of a soft gripper according to an embodiment of the present disclosure in an underwater environment.

The soft gripper according to Present Example 1 was attached to the silicon substrate. The adhesion thereof was measured while gradually increasing the pneumatic pressure over time. The adhesion was measured in a dry environment and an underwater environment. As a result, as shown in FIG. 10a and FIG. 10b, it may be identified that when the pneumatic pressure increases over time, the adhesion increases.

FIG. 14 shows a process in which an object is adsorbed and transferred in water using a soft gripper according to an embodiment of the present disclosure. The object shown in FIG. 14 has a weigh of 500 grams.

As shown in FIG. 14, when the pneumatic pressure is injected into the protuberance 130 in the underwater condition to allow the soft gripper to suction the surface of the object, the object is easily moved out of the water using the soft gripper. The soft gripper may be removed from the object when the pneumatic pressure is removed from the protuberance 130.

Soft Gripper for Gripping Complex Object and Biological Sample

Figure 15:
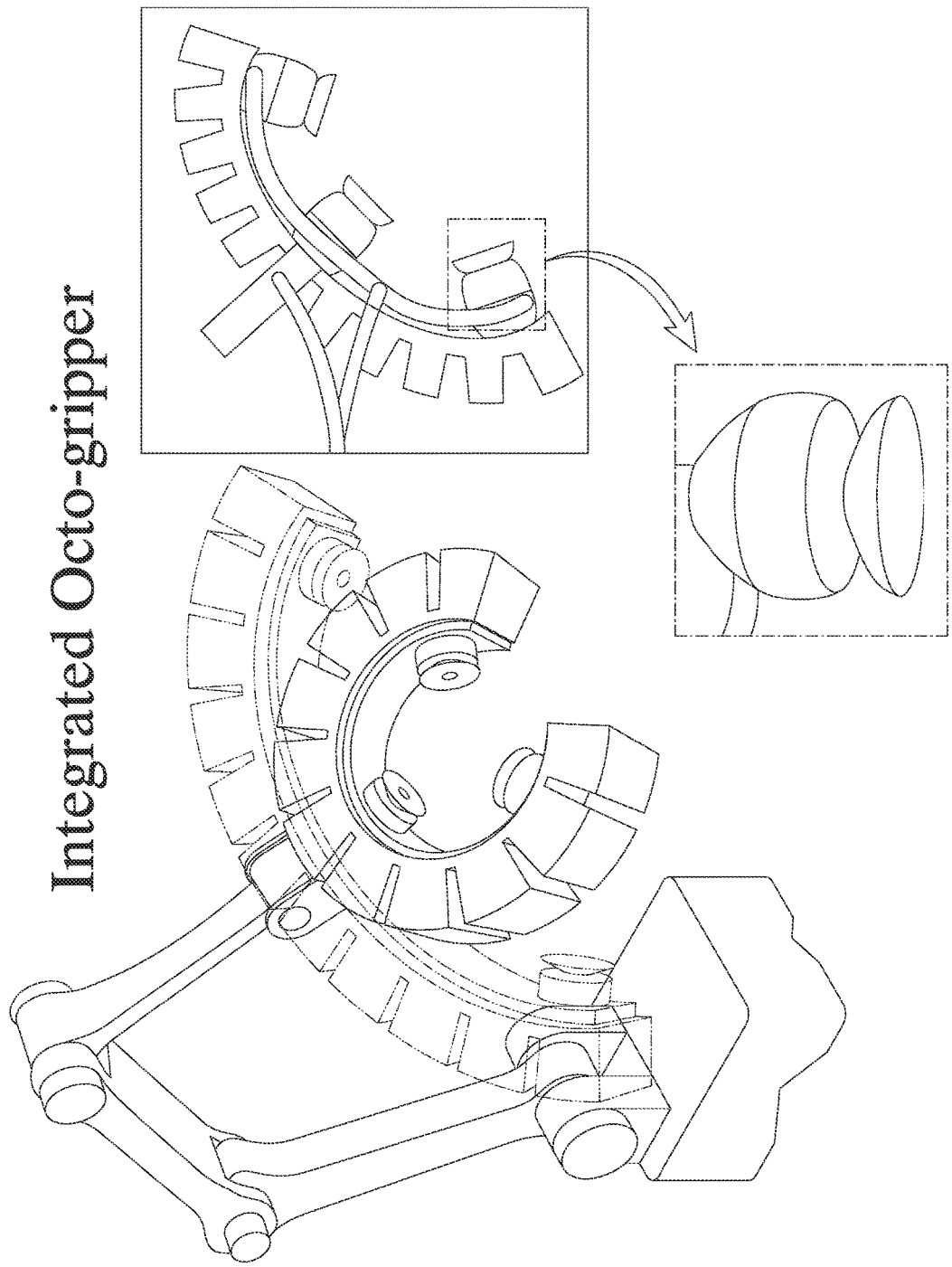
FIG. 15 shows an integration of an octopus arm-derived soft actuator and three soft grippers according to one embodiment of the present disclosure.

In addition, in accordance with the present disclosure, an integrated soft gripper is assembled by integrating three soft gripper-SMs with an octopus arm-derived soft actuator that may be deformed in response to the negative-pressure suction. The integrated soft gripper is shown in FIG. 15. The integrated soft gripper is more effective in gripping complex polyhedrons, rough objects, and delicate and/or wet biological samples such as a swine heart, and a swine liver in a shape-conforming manner.

Additionally, we design a signal and pressure circuit to simultaneously control operations of the soft actuator and the soft gripper-SMs. The integrated soft gripper and the circuit are then connected to a commercial manipulator and are controlled using a button module to demonstrate the gripping ability of complex objects. We initially measure a curvature profile for pneumatic expansion and air release of the soft gripper. In this connection, the deformation is highly responsive to the increase and decrease of the applied pressure and is related to the ability to conform to shapes of objects having varying structural complexity. As shown in FIG. 15, the soft gripper arm is bent in response to the applied pressure and the soft gripper-SMs are activated via pressure injections through separate pneumatic pressure injection paths, respectively. Thus, the soft gripper achieves a highly consistent gripping performance of and adaptability to the swine liver and heart biological samples in the aquatic environment and the wet piggy bank. The integrated soft gripper is effective in negative-pressure based suction and transport of the wet piggy bank, swine heart, and liver. This indicates potential of application of the soft gripper according to the present disclosure to surgical use.

As described above, the present disclosure is described with reference to the drawings. However, the present disclosure is not limited to the embodiments and drawings disclosed in the present specification. It will be apparent that various modifications may be made thereto by those skilled in the art within the scope of the present disclosure. Furthermore, although the effect resulting from the features of the present disclosure has not been explicitly described in the description of the embodiments of the present disclosure, it is obvious that a predictable effect resulting from the features of the present disclosure should be recognized.

What is claimed is:

1. A pneumatic controlled soft gripper comprising:
    a chamber having a negative-pressure action space defined therein and having an opening communicating with the negative-pressure action space;
    a sucker extending radially outwardly from the opening of the chamber and having an annular contact surface;
    an expandable and contractible protuberance protruding from a top face of the negative-pressure action space opposite to the opening, wherein the protuberance is received in the negative-pressure action space, and has a gas pocket defined therein; and
    a gas channel extending from an outer face of the chamber into the gas pocket,
    wherein the pneumatic controlled soft gripper is configured to flow gas into the gas pocket through the gas channel to expand the protuberance in the negative-pressure action space of the chamber, and flow gas out of the gas pocket through the gas channel to contract the protuberance.

2. The pneumatic controlled soft gripper of claim 1, wherein the chamber has an inner wall disposed between the sucker and the protuberance and having a curved shape convex into the negative-pressure action space.

3. The pneumatic controlled soft gripper of claim 2, wherein the gripper is able to work in an underwater environment.

4. The pneumatic controlled soft gripper of claim 1, wherein the protuberance has a hemisphere shape.

5. The pneumatic controlled soft gripper of claim 1, wherein the gripper further comprises projections on a surface of the sucker.

6. The pneumatic controlled soft gripper of claim 1, wherein the pneumatic controlled soft gripper is made of a material selected from a group consisting of polydimethylsiloxane, polyurethane acrylate, polystyrene, polyvinyl alcohol, polyurethane, polyethylene glycol, and combinations thereof.

7. A method for manufacturing the pneumatic gripper of claim 1, the method comprising:
preparing a first mold having:
a first polymer receiving groove in a three-dimensional shape corresponding to a combination of outer shapes of the chamber and the sucker; and
a second polymer receiving groove located in a central upper portion of the first polymer receiving groove;
preparing a second mold having:
a cover;
a gas channel forming portion having a pillar shape extending from a center of the cover; and
a protuberance forming portion coupled to a distal end of the pillar shape and having a shape corresponding to an outer shape of the second polymer receiving groove;
injecting a polymer material into the first polymer receiving groove and the second polymer receiving groove;
disposing the second mold on top of the first mold such that the protuberance forming portion is received in the second polymer receiving groove;
curing the first mold in a high temperature environment for a predefined period of time;
separating the second mold from first mold; and
withdrawing a soft gripper formed in the first mold out of the first mold.

8. The method of claim 7, wherein the method further comprises, after preparing the second mold, surface-treating the first mold and the second mold.

9. The method of claim 8, wherein the surface treatment of the first mold and the second mold includes:

immersing the first mold and the second mold in a self-assembled monolayer (SAM) solution for 50 to 70 minutes;
withdrawing the first mold and the second mold out of the solution; and
curing the first mold and the second mold in an oven of 50 to 70° C. for 11 to 13 hours.

10. The method of claim 7, wherein the polymer material includes a material selected from a group consisting of polydimethylsiloxane, polyurethane acrylate, polystyrene, polyvinyl alcohol, polyurethane, polyethylene glycol, and combinations thereof.

11. A method for transferring an object using the pneumatic gripper of claim 1, the method comprising:
providing the pneumatic gripper of claim 1;
bringing the sucker into close contact with a surface of the object;
creating a negative-pressure in the negative-pressure action space;
transferring the object to a target position; and
removing the negative-pressure in the negative-pressure action space,
wherein creating the negative-pressure includes supplying gas into the gas pocket through the gas channel to expand the protuberance to create the negative-pressure in the negative-pressure action space, and
wherein removing the negative-pressure includes inhaling gas from the gas pocket through the gas channel to contract the protuberance to remove the negative-pressure in the negative-pressure action space.

12. A pneumatic controlled soft gripper comprising:
a chamber having a negative-pressure action space defined therein and having an opening communicating with the negative-pressure action space;
a sucker extending radially outwardly from the opening of the chamber and having an annular contact surface;
an expandable and contractible protuberance protruding from a top face of the negative-pressure action space opposite to the opening, wherein the protuberance is received in the negative-pressure action space, and has a gas pocket defined therein; and
a gas channel extending from an outer face of the chamber into the gas pocket,
wherein gas flows into and out of the gas pocket through the gas channel, and
wherein the chamber has an inner wall disposed between the sucker and the protuberance, a curved shape convex into the negative-pressure action space, and a partially spherical shape.

* * * * *